US008266600B2

(12) United States Patent
Kahlon et al.

(10) Patent No.: US 8,266,600 B2
(45) Date of Patent: Sep. 11, 2012

(54) MODEL CHECKING OF MULTI THREADED SOFTWARE

(75) Inventors: Vineet Kahlon, Plainsboro, NJ (US); Aarti Gupta, Princeton, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 1645 days.

(21) Appl. No.: 11/277,401

(22) Filed: Mar. 24, 2006

(65) Prior Publication Data

US 2006/0218534 A1 Sep. 28, 2006

Related U.S. Application Data

(60) Provisional application No. 60/665,660, filed on Mar. 28, 2005, provisional application No. 60/726,460, filed on Oct. 13, 2005.

(51) Int. Cl.
*G06F 9/44* (2006.01)
(52) U.S. Cl. ......... 717/133; 717/124; 717/126; 717/131
(58) Field of Classification Search .......... 717/104–105, 717/124–135; 703/22; 718/100–101
See application file for complete search history.

(56) References Cited

U.S. PATENT DOCUMENTS

| 5,048,018 A | 9/1991 | Bernstein et al. |
| 5,615,137 A | 3/1997 | Holzmann et al. |
| 5,822,588 A | 10/1998 | Sterling et al. |
| 5,931,919 A * | 8/1999 | Thomas et al. ............ 719/315 |
| 6,009,269 A | 12/1999 | Burrows et al. |
| 6,178,394 B1 | 1/2001 | Godefroid |
| 6,286,130 B1 | 9/2001 | Poulsen et al. |
| 6,295,515 B1 | 9/2001 | Kurshan et al. |
| 6,343,371 B1 | 1/2002 | Flanagan et al. |
| 6,505,342 B1 | 1/2003 | Hartmann |
| 6,851,075 B2 | 2/2005 | Ur et al. |
| 6,892,290 B2 | 5/2005 | Van Doren |
| 6,895,476 B2 | 5/2005 | Tierney et al. |
| 7,000,080 B2 | 2/2006 | Van Doren et al. |
| 2004/0225870 A1 | 11/2004 | Srinivasan |
| 2005/0038806 A1 | 2/2005 | Ma |
| 2005/0086648 A1 | 4/2005 | Andrews et al. |
| 2005/0177775 A1 | 8/2005 | Qadeer et al. |

(Continued)

FOREIGN PATENT DOCUMENTS

EP 1202172 A1 5/2002

OTHER PUBLICATIONS

A. Bouajjani, J. Esparza, and O. Maier. "Reachability Analysis of Pushdown Automata: Application to Model-Checking", 1997, In Proc. Intern. Conf. on Concurrency Theory (Concur '97), LNCS 1243, 1997.*

(Continued)

*Primary Examiner* — Lewis A Bullock, Jr.
*Assistant Examiner* — Mark Gooray
(74) *Attorney, Agent, or Firm* — Joseph Kolodka

(57) ABSTRACT

A technique for model checking of multi-threaded software is herein disclosed which advantageously can be used to verify correctness properties expressed using temporal logic, e.g., linear time temporal logic and branching time temporal logic. The model checking problem of a concurrent system is decomposed into a plurality of model checking problems on individual threads of the multi-threaded software.

17 Claims, 4 Drawing Sheets

U.S. PATENT DOCUMENTS

2005/0216798 A1  9/2005  Yu
2005/0283780 A1  12/2005  Karp et al.
2005/0283781 A1  12/2005  Karp et al.

OTHER PUBLICATIONS

A. Finkel, B. Willems, and P. Wolper, "A Direct Symbolic Approach to Model Checking Pushdown Systems", Jul. 1997, In Infinity '97 Workshop, vol. 9.*

C. Flanagan, and S. Qadeer, "Thread-Modular Model CHecking", 2002, Springer, In Proc. CAV, LNCS 2404, pp. 180-194.*

Boujjani, A. et al., "Reachability analysis of push-down automata: Application to model-checking", in CONCUR, LNCS 1243, 1997.

Boujjani, A., et al., "A generic approach to the static analysis of concurrent programs with procedures", in IJFCS, vol. 4 (4), 2003.

Esparza, J. et al., "A bdd-based model checker for recursive program", in CAV, 2001.

Godefroid, P., "Model checking for programming languages using verisoft", in POPL, 1997.

Godefroid, P. et al., "Using partial orders for efficient verification of deadlock-freedom and safety properties", in Formal Methods in Systems Design, 1993.

Godefroid, P., "VeriSoft: A tool for the automatic analysis of concurrent reactive software", Proceedings of the 9th Conference on Computer Aided Verification, Jun. 1997.

Henzinger, T. et al., "Thread-modular abstraction refinement", in CAV, NCS 2725, 2003.

Ivancic, F. et al., "Efficient SAT-based bounded model checking for software verification", in Symposium on Leveraging Applications of Formal Methods, 2004.

Qadeer, S. et al., "Summarizing procedures in concurrent programs", in POPL'04, Jan. 2004.

Flanagan, C. et al., "Thread-modular model checking", in SPIN Workshop on Software Verification, 2003.

Walukeiwicz, I., "Model checking ctl properties of pushdown systems", in FSTTCS, LNCS 1974, 2000.

Ramalingam, G., "Context-sensitive synchronization-sensitive analysis is undecidable", in ACM Transacations on Programming Languages and Systems, vol. 22, No. 2, Mar. 2000.

Reps, T. et al., "Precise interprocedural dataflow analysis via graph reachability", in POPL '05, 1995.

Schmidt, D.A. et al., "Program analysis as model checking of abstract interpretations", in Static Analysis, 5th International Symposium, LNCS 1503, 1998.

Stoller, S.D., "Model-checking multi-threaded distributed java programs", in Software Tools for Technology Manuscript, vol. 4, No. 1, 2002.

Visser, W. et al., "Model checking programs", in Automated Software Engineering, vol. 10, No. 2, 2003.

* cited by examiner

Global Locks: a,b,c

```
foo_nested()    {              bar() {
    acquire(a);                    release(b);
    acquire(b);                    release(a);
    bar();
                                   acquire(c);
    release(c);
}                              } foo_non_nested()   {
acquire(b);
acquire(a);
bar();    release(c);
}
```

FIG. 2

MODEL CHECKING OF MULTI THREADED SOFTWARE

This application claims the benefit of and is a non-provisional of U.S. Provisional Application No. 60/665,660, entitled "MODEL CHECKING THREADS FOR LTL PROPERTIES," filed on Mar. 28, 2005, and U.S. Provisional Application No. 60/726,460, entitled "MODEL CHECKING THREADS FOR BRANCHING-TIME PROPERTIES," filed on Oct. 13, 2005, the contents of which are incorporated by reference herein.

This application is also related to U.S. Non-Provisional application Ser. No. 11/174,791, entitled "METHOD FOR STATIC ANALYSIS OF CONCURRENT MULTI-THREADED SOFTWARE," filed on Jul. 5, 2005, the contents of which are incorporated by reference herein.

BACKGROUND OF INVENTION

The invention relates to formal analysis and verification of computer systems.

Multi-threading is a well-known and pervasive technique for extracting performance from a computer system by exploiting parallelism among its different components. Unfortunately, the many possible interleavings among the local operations of individual threads makes multi-threaded software behaviorally complex and difficult to analyze. It would be advantageous to apply formal methods to debug such systems, but existing techniques for verifying concurrent programs suffer from various drawbacks. Some prior art schemes do not scale to large programs due to the state space explosion problem. Some techniques such as thread modular model checking are not guaranteed complete, thus resulting in possible bogus error traces. Other prior art techniques rely on manual and hence time-consuming abstractions to compress the state space enough to make verification amenable.

In co-pending commonly-assigned U.S. Utility patent application Ser. No. 11/174,791, the contents of which are incorporated by reference, a new model checking technique was disclosed which reduces the problem of correctness of a concurrent program comprised of multiple threads communicating via locks to one concerned with verifying augmented versions of each individual thread. It would be advantageous to extend the technique disclosed therein to a broad range of correctness properties, e.g., as expressed using full-blown temporal logic.

SUMMARY OF INVENTION

A technique for model checking of multi-threaded software is herein disclosed which advantageously can be used to verify correctness properties expressed using temporal logic, e.g., linear time temporal logic and branching time temporal logic. The model checking problem of a concurrent system is decomposed into a plurality of model checking problems on individual threads of the multi-threaded software.

In one embodiment, the multi-threaded software is modeled as a concurrent system comprising pushdown systems communicating using nested locks, each thread modeled as a pushdown system. An automaton is constructed for the correctness property expressed as a temporal logic formula, and a product automaton is constructed from this automaton and the concurrent system of pushdown systems. The model checking problem then reduces to deciding whether the product automaton has an accepting path. Unfortunately, systems comprised of multiple pushdown systems do not have a finite number of states since they have stacks which can potentially grow to an unbounded depth. Nevertheless, due to the structure of nested locks which loosely couples the pushdown systems, the acceptance condition in the product automaton can be formulated as multiple instances of a reachability problem on the individual threads. In one embodiment, lock-constrained multi-automata pairs are constructed to capture regular sets of configurations of the concurrent system. The lock interaction among threads is encoded into the acceptance conditions for the lock-constrained multi-automata pair which filters out those local configurations of the threads which are not simultaneously reachable due to lock interaction. To capture lock interaction, patterns of lock acquisitions and releases are tracked in what the inventors refer to as a backward acquisition history and a forward acquisition history. The computation of predecessor sets for the concurrent system thereby can be decomposed into computations of predecessor sets on the constituent threads, this decomposition advantageously avoiding the state explosion problem.

The disclosed technique advantageously is exact and efficient—provably avoiding false error traces. It is sound and complete and caters to automatic error trace recovery. Moreover, it can be readily incorporated into existing model checking tools by exploiting existing implementations for calculating predecessor sets. These and other advantages of the invention will be apparent to those of ordinary skill in the art by reference to the following detailed description and the accompanying drawings.

BRIEF DESCRIPTION OF DRAWINGS

FIG. 2 illustrates the concept of nested locks.

DETAILED DESCRIPTION

Figure 1:
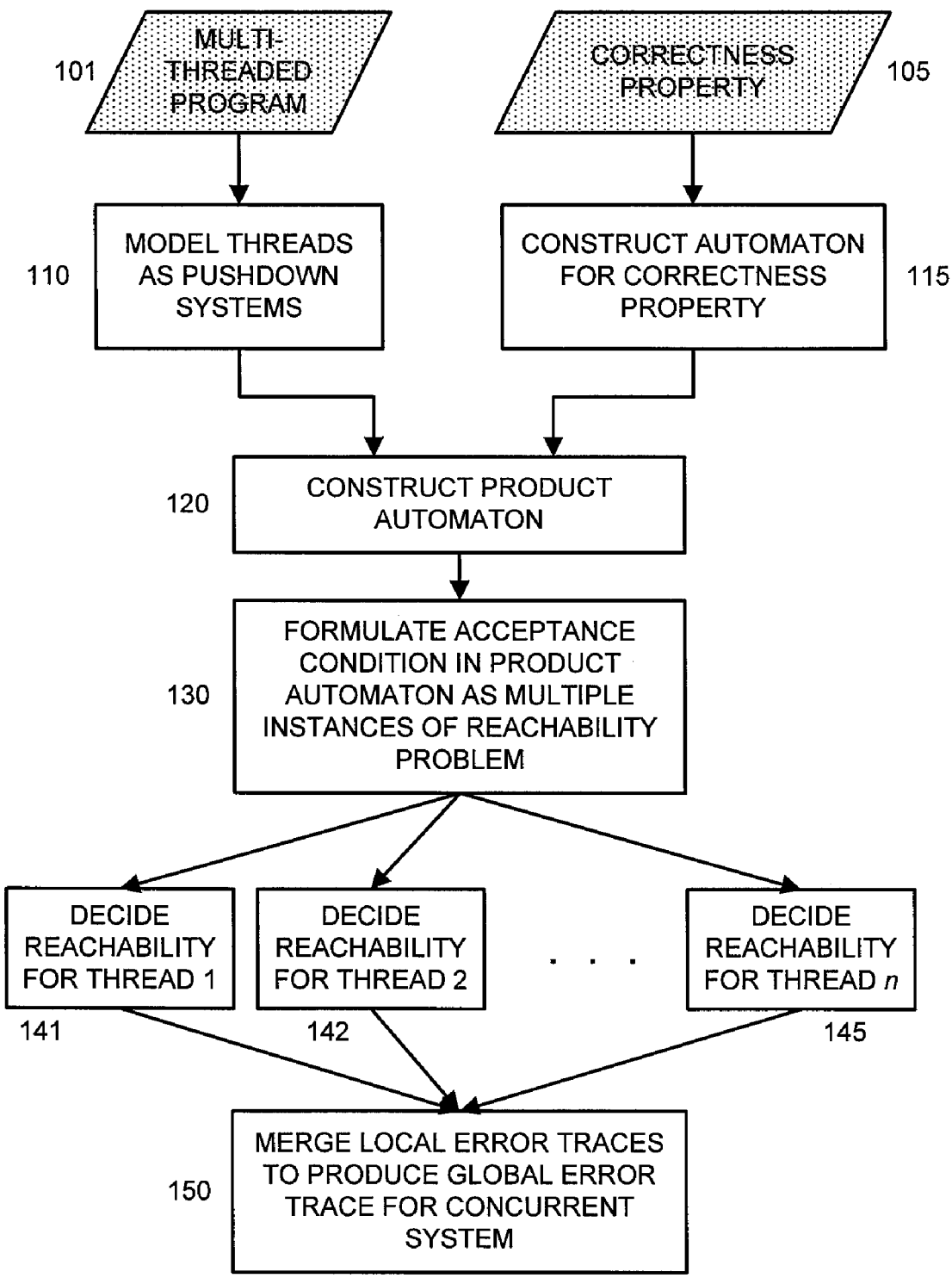
FIG. 1 is a flowchart of processing performed by a model checking using a correctness property expressed with temporal logic.

FIG. 1 is a flowchart of processing performed by a model checker upon a multi-threaded program 101. The goal is to determine what configurations of the model of the multi-threaded program 101, when executed, satisfy the correctness property 105, which is expressed using temporal logic.

At step 110 in FIG. 1, the multi-threaded program 101 is preferably modeled using pushdown systems (PDSs) which communicate using locks. The multi-threaded program can either be directly modeled as a system comprised of threads communicating via locks or can, by applying standard abstract interpretation techniques, be reduced to such a framework. Each thread in the multi-threaded program 101 is modeled as a pushdown system. For example, each procedure of a thread can be represented as a flow graph, each node of which represents a control point of the procedure. The edges of the flow graph can be annotated with statements that could be assignments, calls to other procedures of the same thread, or the acquire or release of locks when the thread needs access to shared resources. Recursion and mutual procedure calls can be allowed. Abstract interpretation techniques can be used to get a finite representation of the control states of the original thread (this can introduce non-determinism which can be explicitly allowed). The resulting framework of finite state flow graphs with recursion can be naturally modeled as a pushdown system. The examples discussed herein, for ease of illustration, primarily consider two threads, although the disclosed technique can be readily extended by one of ordinary skill in the art to more than two threads.

It can be shown that, unlike the general problem of two or more coupled pushdown systems which is not decidable, this problem is decidable if the locks are nested. Herein, a concurrent program is said to access locks in a nested fashion iff along each computation of the program a thread can only release the last lock that it acquired along that computation and that has not yet been released. FIG. 2 shows an example. In FIG. 2, the thread comprised of procedures foo_nested and bar accesses locks a, b, and c in a nested fashion whereas the thread comprised of procedures foo_not_nested and bar does not. This is because calling bar from foo_non_nested releases lock b before lock a even though lock a was the last one to be acquired.

The correctness properties 105 of the concurrent program can be expressed as a formula f using temporal logic, e.g., as further discussed herein, using linear time temporal logic or branching time temporal logic. Accordingly, a broad range of properties can be expressed; the technique is not limited to correctness properties such as deadlocks or data races.

The model checker proceeds to process the concurrent system model and the correctness property by essentially decomposing the model checking problem of the concurrent system into a plurality of model checking problems on individual threads of the multi-threaded software. By reducing the problem of the correctness of the concurrent system to multiple instances of model checking problems on the constituent threads, existing model checking techniques can be used at 141, 142, . . . 145 to solve the individual model checking problems. Then, at step 150, the results from the plurality of individual model checking problems can be merged to obtain a general result for the concurrent system.

For example, and as illustrated by FIG. 1, the model checking problem of the concurrent system of pushdown systems can be represented using an automata-theoretic paradigm. At 115, an automaton is constructed for the correctness property. As discussed further herein, for example, where the correctness property is expressed using linear time temporal logic such as LTL, the automaton can be a Büchi automaton constructed using known techniques which corresponds to the negation of the LTL formula f. At 120, a product automaton can be constructed from the automaton of the correctness property and from the concurrent system of pushdown systems. Then, using the automata-theoretic approach, the model checking problem reduces to deciding whether the product automaton has an accepting path, i.e., a path along which a final state occurs infinitely often. Checking the non-emptiness of the product automaton is complicated by the fact that systems comprised of pushdown systems have infinitely many states in general. For finite state systems, along any infinite path some state must occur infinitely often and so along any accepting path of the system there must be an occurrence of a final state along a subsequence of the accepting path that starts and ends at the same state. This observation reduces the problem of deciding the non-emptiness of the product automaton to showing the existence of a finite lollipop, i.e., a finite path of the product automaton leading to a cycle with an accepting state which can be pumped indefinitely to yield an accepting computation. For infinite-state systems, however, the above observation is no longer valid. Indeed, in the present case each thread has a stack which could potentially grow to be of unbounded depth and so the existence of a cycle of global states is not guaranteed. Fortunately at 130, and as discussed in further detail herein, the model checking problem can be decomposed into multiple instances of the reachability problem, i.e., whether a given set of states of a system is reachable from another given state. Since the number of states of a given system may be infinite in general, it is not possible to perform reachability by simply traversing its state space. Instead, the model checking problems can be solved by checking reachability of states sets which can be represented as context-free grammars. For example, with respect to automata, the context-free grammars can be represented as multi-automata. By performing reachability over the context-free grammars rather than the states themselves, the technique avoids the state space explosion problem while guaranteeing termination and leading to no loss in precision.

An embodiment of the technique will be discussed in further detail below with regard to linear time temporal logic and branching time temporal logic formulations of the correctness properties.

Linear Time Temporal Logic

Let f be a formula expressing a linear time temporal logic property, such as an LTL property. The concurrent program with n threads $T_1, \ldots, T_n$ and m locks $l_1, \ldots, l_m$ can be formally defined as a tuple of the form $\mathcal{CP}=(T_1, \ldots, T_n, L_1, \ldots, L_m)$, where for each i, $T_i$ is a thread modeled as a pushdown system and, for each j, $L_j \subseteq \{\bot, T_1, \ldots, T_n\}$ is a representation of the possible set of values that lock $l_j$ can be assigned. Each thread is modeled as a pushdown system which has a finite control part corresponding to the valuation of the variables of the thread it represents and a stack which models recursion. Formally, a PDS can be represented by a five-tuple $\mathcal{P}=(P, Act, \Gamma, c_0, \Delta)$, where P is a finite set of control locations, Act is a finite set of actions, $\Gamma$ is a finite stack alphabet, and $\Delta \subseteq (P \times \Gamma) \times Act \times (P \times \Gamma^*)$ is a finite set of transition rules. If $((p, \gamma), a, (p', w)) \in \Delta$ then we write $$\langle p, \gamma \rangle \stackrel{a}{\hookrightarrow} \langle p', w \rangle.$$

A configuration of $\mathcal{P}$ is a pair $\langle p, w \rangle$, where $p \in P$ denotes the control location and $w \in \Gamma^*$ the stack content. We call $c_0$ the initial configuration of $\mathcal{P}$. The set of all configurations of $\mathcal{P}$ is denoted by $\mathcal{C}$. The rest of the details of the system model are set forth in the APPENDIX.

The goal is to compute the set of configurations of $\mathcal{CP}$ such that every run starting from the set satisfies the correctness property f.

Figure 3:
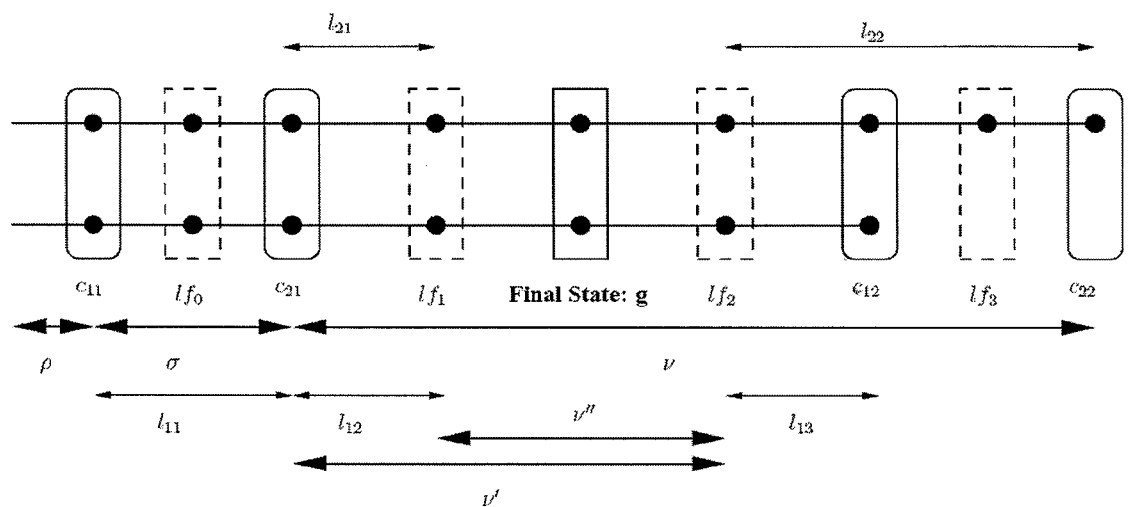
FIG. 3 is an abstract diagram of a pumpable witness.

As illustrated by FIG. 1, a Büchi automaton can be constructed which corresponds to the negation of f, i.e., $\mathcal{B}_{\neg f}$, corresponding to ¬f. The Büchi automation can be constructed from linear time temporal logics using known techniques. A product automaton $\mathcal{BP}$ can then be constructed which denotes the Büchi system formed by the product of $\mathcal{CP}$ and $\mathcal{B}_f$, the Büchi automaton. Then, using the automata-theoretic approach, the model checking problem reduces to deciding whether $\mathcal{BP}$ has an accepting path. It can be shown that the problem of deciding whether there exists an accepting computation of $\mathcal{BP}$ can be reduced to showing the existence of a finite lollipop-like witness with a special structure. Consider a $\mathcal{CP}$ comprised of the threads $T_1=(P_1, Act, \Gamma_1, c_1, \Delta_1)$ and $T_2=(P_2, Act, \Gamma_2, c_2, \Delta_2)$. It can be proved that $\mathcal{BP}$ has an accepting run starting from an initial configuration c if and only if there exist $\alpha \in \Gamma_1, \beta \in \Gamma_2; u \in \Gamma^*_1, v \in \Gamma^*_2$; an accepting configuration g; configurations $lf_0, lf_1, lf_2$ and $lf_3$ in which all locks are free; lock values $l_1, \ldots, l_m, l'_1, \ldots, l'_m$; control states p', p'''∈$P_1$, q', q''∈$P_2$; u', u'', u'''∈$\Gamma^*_1$; and v', v'', v'''∈$\Gamma^*_2$ satisfying the following conditions 1. $c \Rightarrow (\langle p, \alpha u \rangle, \langle q', v' \rangle, l_1, \ldots, l_m)$ 2. $(\langle p, \alpha \rangle, \langle q', v' \rangle, l_1, \ldots, l_m) \Rightarrow lf_0 \Rightarrow (\langle p', u' \rangle, \langle q, \beta v \rangle, l'_1, \ldots, l'_m)$ 3. $(\langle p', u' \rangle, \langle q, \beta \rangle, l'_1, \ldots, l'_m)$ $\Rightarrow lf_1$ $\Rightarrow g$ $\Rightarrow lf_2$ $\Rightarrow (\langle p, \alpha u'' \rangle, \langle q'', v'' \rangle, l_1, \ldots, l_m)$ $\Rightarrow lf_3$ $\Rightarrow (\langle p''', u''' \rangle, \langle q, \beta v''' \rangle, l'_1, \ldots, l'_m)$ The above result gives the required witness with the special structure, as illustrated by FIG. 3. The witness comprises a stem ρ which is a finite path of $\mathcal{BP}$, and a (pseudo-)cycle which is a sequence v of transitions with an accepting state of $\mathcal{BP}$ having the following two properties (i) executing v returns each thread of the concurrent program to the same control location with the same symbol at the top of its stack as it started with, and (ii) executing it does not drain the stack of any thread, viz., any symbol that is not at the top of the stack of a thread to start with is not popped during the execution of the sequence. These properties enable us to construct a valid accepting sequence of $\mathcal{BP}$ by executing the sequence v repeatedly resulting in the pumping of each of the threads. The lock interaction among the threads, however, complicates the interleaved execution of the pumping sequences of the individual threads which therefore requires an intricate scheduling of their local transitions.

The execution of the local pumping sequences of the two threads can be interleaved as follows to construct a valid accepting path of $\mathcal{BP}$. Assume ρ, σ, v are the sequences of global configurations realizing conditions 1, 2 and 3, respectively, in the above statement. First, define sequences of transitions spliced from ρ, σ and v that we will concatenate appropriately to construct the accepting path.

$l_{11}$: the local sequence of $T_1$ fired along σ.

$l_{12}$: the local sequence of $T_1$ fired along v between $c_{21}=(\langle p', u' \rangle, \langle q, \beta \rangle, l'_1, \ldots, l'_m)$ and $lf_1$.

$l_{13}$: the local sequence of $T_1$ fired along v between $lf_2$ and $c_{12}=(\langle p, \alpha u'' \rangle, \langle q'', v'' \rangle, l_1, \ldots, l_m)$.

$l_{21}$: the local sequence of $T_2$ fired along v between $c_{21}=(\langle p', u' \rangle, \langle q, \beta \rangle, l'_1, \ldots, l'_m$ and $lf_1$.

$l_{22}$: the local sequence of $T_2$ fired along v between $lf_2$ and $c_{22}=(\langle p''', u''' \rangle, \langle q, \beta v''' \rangle, l_1, \ldots, l_m)$.

v': the sequence of global transitions fired along v till $lf_2$.

v'': the sequence of global transitions fired along v between $lf_1$ and $lf_2$.

Then π: ρσv' $(l_{13} l_{11} l_{12} l_{22} l_{21} v'')^\omega$ is a scheduling realizing an accepting valid run of BP. Intuitively, thread $T_1$ is pumped by firing the local transitions occurring along the sequences $l_{13} l_{11} l_{12}$ followed by the local computation of $T_1$ along v''. Similarly, $T_2$ is pumped by firing the local transitions occurring along the sequences $l_{22} l_{21}$ followed by the local computation of $T_2$ along v''. Note that the pumping sequences of the two threads are staggered with respect to each other. The lock free configurations $lf_0, \ldots, lf_3$ are breakpoints that help in scheduling to ensure that π is a valid path.

Conditions 1, 2 and 3 in the statement above can be re-formulated as a set of reachability problems for regular sets of configurations. Let $R_0 = \text{pre}^*(\{p\} \times \alpha \Gamma^*_1 \times P_2 \times \Gamma^*_2 \times \{(l_1, \ldots, l_m)\})$ Then condition 1 can be re-written as $c \in R_0$. Similarly, if $R_1 = P_1 \times \Gamma^*_1 \times \{q\} \times \beta \Gamma^*_2 \times \{(l'_1, \ldots, l'_m)\}$ $R_2 = \text{pre}^*(R_1) \cap P_1 \times \Gamma^*_1 \times P_2 \times \Gamma^*_2 \times \{(\bot, \ldots, \bot)\}$.

$R_3 = \text{pre}^*(R_2) \cap \{p\} \times \{\alpha\} \times P_2 \times \Gamma^*_2 \times \{(l_1, \ldots, l_m)\}$ then condition 2 can be captured as $R_3 \neq \emptyset$. Finally, let $R_4 = P_1 \times \Gamma^*_1 \times \{q\} \times \beta \Gamma^*_2 \times \{(l'_1, \ldots, l'_m)\}$ $R_5 = \text{pre}^*(R_4) \cap P_1 \times \Gamma^*_1 \times P_2 \times \Gamma^*_2 \times \{(\bot, \ldots, \bot)\}$.

$R_6 = \text{pre}^*(R_5) \cap \{p\} \times \alpha \Gamma^*_1 \times P_2 \times \Gamma^*_2 \times \{(l_1, \ldots, l_m)\}$ $R_7 = \text{pre}^*(R_6) \cap P_1 \times \Gamma^*_1 \times P_2 \times \Gamma^*_2 \times \{(\bot, \ldots, \bot)\}$.

$R_8 = \text{pre}^*(R_7) \cap G \times L_1 \times \ldots \times L_m$, where $G = \cup_{g_1, g_2}(\{g_1\} \times \Gamma^*_1 \{xg_2\} \times \Gamma^*_2)$ with $(g_1, g_2)$ being an accepting state of BP.

$R_9 = \text{pre}^+(R_8) \cap P_1 \times \Gamma^*_1 \times P_2 \times \Gamma^*_2 \times (\bot, \ldots, \bot)$.

$R_{10} = \text{pre}^*(R_9) \cap P_1 \times \Gamma^*_1 \times \{q\} \times \{\beta\} \times \{l'_1, \ldots, l'_m\}$.

Then condition 3 can be captured as $R_{10} \neq \emptyset$.

Accordingly, by exploiting the special structure of the witness (pseudo-)lollipop, it is possible to reduce the problem of deciding its existence to the computation of pre*-closures of regular sets of configurations of $\mathcal{CP}$. Due to the witness structure, for model checking LTL formulae for programs with nested locks, we need to either (i) compute pre*-closures for a set C of configurations in which all locks are free, or (ii) compute those configurations of the pre*-closure of a set (that possibly contains configurations in which some locks are held) in which all locks are free.

LMAP.

The computation of the pre*-closures can be accomplished efficiently by introducing the concept of what the inventors refer to as a lock-constrained multi-automata. Given a concurrent program $\mathcal{CP}$ comprised of the two threads $T_1 = (P_1, Act_1, \Gamma_1, c_1, \Delta_1)$ and $T_2 = (P_2, Act_2, \Gamma_2, c_2, \Delta_2)$, it is necessary to keep track of the contents of the stacks of both $T_1$ and $T_2$. This is accomplished by using a pair of multi-automata (MAs). We define a Lock-Constrained Multi-Automata Pair (LMAP) for $\mathcal{CP}$, denoted by $\mathcal{CP}$-LMAP, as a pair $(\mathcal{A}_1, \mathcal{A}_2)$, where $\mathcal{A}_i = (\Gamma_i, Q_i, \delta_i, I_i, F_i)$ is a multi-automaton accepting a (regular) set of configurations of thread $T_i$. MAs are used to capture regular (potentially infinite) sets of configurations of a single PDS in a finite form. LMAPs play a similar role in the context of multiple loosely-coupled PDSs, by allowing us to succinctly and finitely represent potentially infinite sets of configurations of the given concurrent program in a way that enables us to compute their pre*-closure efficiently. The broad idea is that a global configuration c is accepted by $\mathcal{A}$ iff the local configurations of $T_1$ and $T_2$ in c are accepted by $\mathcal{A}_1$ and $\mathcal{A}_2$, respectively.

It is also necessary to factor in lock interaction among the threads that prevents them from simultaneously reaching certain pairs of local configurations. To capture lock interaction, we introduce the concepts of backward acquisition history (BAH) and forward acquisition history (FAH).

Backward Acquisition History.

Figure 4:
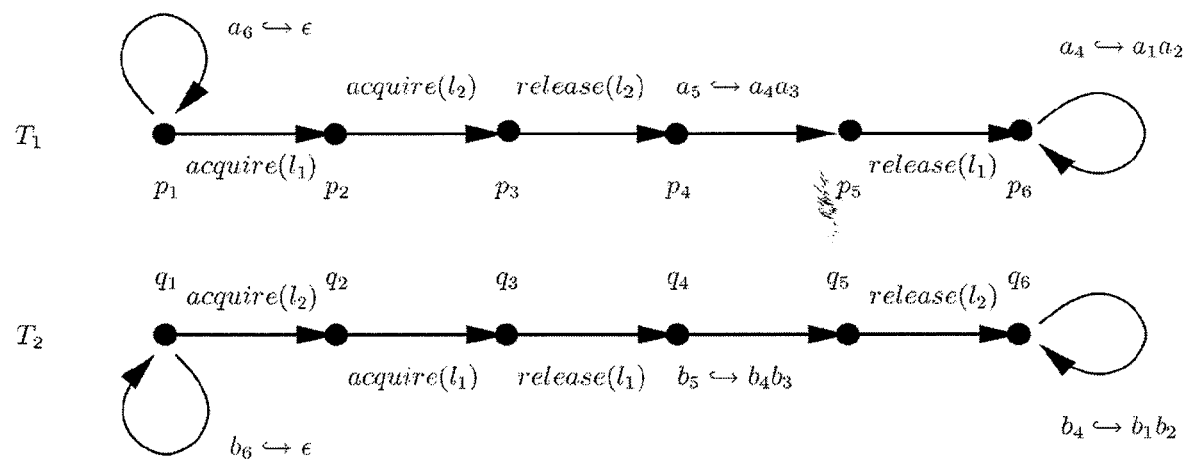
FIG. 4 is an abstract diagram showing two threads $T_1$ and $T_2$ modeled as pushdown systems.

FIG. 4 is an abstract diagram showing a concurrent program $\mathcal{CP}$ with two PDS threads $T_1$ and $T_2$ with locks $l_1$ and $l_2$.

Suppose that we are interested in computing the pre*-closure of the set LC={$\langle p_6, a_1a_2a_3\rangle, \langle q_6, b_1b_2b_3\rangle, \bot, \bot)$}, i.e., the set of configurations c of $\mathcal{CP}$ such there is a path from c to a configuration d in LC. Note that in each configuration of LC all locks are free. By tracking patterns of backward lock releases, we can reduce this to evaluating the pre*-closures of regular sets of configurations $LC_1$={$\langle p_6, a_1a_2a_3\rangle, \bot, \bot)$} of thread $T_1$ and $LC_2$={$\langle q_6, b_1b_2b_3\rangle, \bot, \bot)$} of $T_2$ for the concurrent programs comprised solely of the individual threads $T_1$ and $T_2$, respectively, instead of the original multi-threaded program. Consider, for example, the configuration $(\langle p_2, a_5\rangle, T_1, \bot)$, which belongs to pre*$_{T_1}(LC_1)$ the path $$(\langle p_2, a_5\rangle, T_1, \bot) \xrightarrow{acquire(l_2)} (\langle p_3, a_5\rangle, T_1, T_1) \xrightarrow{release(l_2)}$$
$$(\langle p_4, a_5\rangle, T_1, \bot) \rightarrow (\langle p_5, a_4a_3\rangle, T_1, \bot) \xrightarrow{release(l_1)}$$
$$(\langle p_6, a_4a_3\rangle, \bot, \bot) \rightarrow (\langle p_6, a_1a_2a_3\rangle, \bot, \bot) \text{ of } T_1;$$

and the configuration $(\langle q_2, b_5\rangle, \bot, T_2)$ which belongs to pre*$_{T_2}$ ($LC_2$) via the path $$(\langle q_2, b_5\rangle, \bot, T_2) \xrightarrow{acquire(l_1)} (\langle q_3, b_5\rangle, T_2, T_2) \xrightarrow{release(l_1)}$$
$$(\langle q_4, b_5\rangle, \bot, T_2) \rightarrow (\langle q_5, b_4b_3\rangle, \bot, T_2) \xrightarrow{release(l_2)}$$
$$(\langle q_6, b_4b_3\rangle, \bot, \bot) \rightarrow (\langle q_6, b_1b_2b_3\rangle, \bot, \bot) \text{ of } T_2.$$

Unless clear from the context, we use pre*$_{Ti}$(C) to denote the pre*-closures for a set C of configurations of thread $T_i$. Note that even though $T_1$ and $T_2$ hold different sets of locks, i.e., $\{l_1\}$ and $\{l_2\}$, respectively, at control locations $p_2$ and $q_2$, there does not exist a global configuration of $\mathcal{CP}$ with $T_1$ and $T_2$ in the local configurations $(\langle p_2, a_5\rangle, T_1, \bot)$ and $(\langle q_2, b_5\rangle, \bot, T_2)$, respectively, that is backward reachable in $\mathcal{CP}$ from $(\langle p_6, a_1a_2a_3\rangle, \langle q_6, b_1b_2b_3\rangle, \bot, \bot)$. The reason is that in order for $T_1$ to reach $p_6$ from $p_2$ it first has to acquire (and release) lock $l_2$. However, in order to do that $T_2$, which currently holds lock $l_2$, must release it. But for $T_2$ to release $l_2$, it first has to acquire (and release) $l_i$ which is currently held by $T_1$. This creates an unresolvable cyclic dependency.

In general, when testing for backward reachability of c from d in $\mathcal{CP}$, it suffices to test whether there exist local paths x and y in the individual threads from states $c_1 = c\downarrow T_1$ to $d_1 = d\downarrow T_1$ and from $c_2 = c\downarrow T_2$ to $d_2 = d\downarrow T_2$, respectively, such that along x and y locks can be acquired in a compatible fashion. Compatibility ensures that we do not end up with an unresolvable cyclic dependency as above. This allows us to reconcile x and y to get a valid path of $\mathcal{CP}$ from c to d. The notion of backward acquisition history captures patterns of lock releases from d to c that can be used to test compatibility.

The notion of Backward Acquisition History can be defined formally as follows. Let x be a computation of a concurrent program $\mathcal{CP}$ leading from configurations c to d. Then for thread $T_i$ and lock $l_j$ of $\mathcal{CP}$, if $l_j \notin$ Lock-Set($T_i$, c) then BAH($T_i$, c, $l_j$, x) is defined to be the empty set $\emptyset$. If $l_j \in$ Lock-Set($T_i$, c), then BAH($T_i$, c, $l_j$, x) is the set of locks that were released (and possibly acquired) by $T_i$ after the last release of $l_j$ by $T_i$ in traversing backward along x from d to c. If $l_j \in$ Lock-Set($T_i$, c) and $l_j$ wasn't released along x, then BAH($T_i$, c, $l_j$, x) is the set of locks that were released (and possibly acquired) by $T_i$ in traversing backwards along x. The following backward decomposition result can then be proven: Let $\mathcal{CP}$ be a concurrent program comprised of the two threads $T_1$ and $T_2$ with nested locks. Then configuration c of $\mathcal{CP}$ is backward reachable from configuration d in which all locks are free iff configurations $c_1 = c\downarrow T_1$ of $T_1$ and $c_2 = c\downarrow T_2$ of $T_2$ are backward reachable from configurations $d_1 = d\downarrow T_1$ and $d_2 = d\downarrow T_2$, respectively, via computation paths x and y of programs comprised solely of threads $T_1$ and $T_2$, respectively, such that 1. Lock-Set($T_1$, $c_1$) $\cap$ Lock-Set($T_2$, $c_2$) = $\emptyset$
2. there do not exist locks $l \in$ Lock-Set($T_1$, $c_1$) and $l' \in$ Lock-Set($T_2$, $c_2$) such that $l \in$ BAH($T_2$, $c_2$, $l'$, y) and $l' \in$ BAH($T_1$, $c_1$, $l$, x).

The configuration of each individual thread can, accordingly, be augmented with a backward acquisition history entry for each lock. Thus a configuration of a program comprised solely of thread $T_i$ is now of the form ($\langle c, w\rangle, l_1, \ldots, l_m$, $BAH_1, \ldots, BAH_m$) where $BAH_i$ tracks the BAH of lock $l_i$. Consider the example in FIG. 4 again, but with BAH-augmented configurations. It can be seen that augmented configuration $(\langle p_2, a_5\rangle, T_1, \bot, \{l_2\}, \emptyset)$ of thread $T_1$ belongs to pre*$_{T_1}(\{d_1\})$ via the path (of augmented configurations) x:

$$(\langle p_2, a_5\rangle, T_1, \bot, \{l_2\}, \emptyset) \xrightarrow{acquire(l_2)} (\langle p_3, a_5\rangle, T_1, T_1, \{l_2\}, \emptyset) \xrightarrow{release(l_2)}$$
$$(\langle p_4, a_5\rangle, T_1, \bot, \emptyset, \emptyset) \rightarrow (\langle p_5, a_4a_3\rangle, T_1, \bot, \emptyset, \emptyset) \xrightarrow{release(l_1)}$$
$$(\langle p_6, a_4a_3\rangle, \bot, \bot, \emptyset, \emptyset) \rightarrow (\langle p_6, a_1a_2a_3\rangle, \bot, \bot, \emptyset, \emptyset)$$

Note that in traversing backwards from the configuration ($\langle p_6, a_4a_3\rangle, \bot, \bot, \emptyset, \emptyset$) via the transition release($l_1$), we set $l_1 = T_1$ indicating that $l_1$ is now held by $T_1$. Next, in traversing backwards from the configuration ($\langle p_4, a_5\rangle, T_1, \bot, \emptyset, \emptyset$) via the transition release($l_2$) and set $l_2 = T_1$ and add lock $l_2$ to the backward acquisition history of lock $l_1$ as it is currently held by $T_1$. Similarly we can see that configuration ($\langle q_2, b_5\rangle, \bot, T_2, \emptyset, \{l_1\}$) of the augmented thread $T_2$ belongs to pre*$_{T_2}(\{d_2\})$ via the path y:

$$(\langle q_2, b_5\rangle, \bot, T_2, \emptyset\{l_1\}) \xrightarrow{acquire(l_1)} (\langle q_3, b_5\rangle, T_2, T_2, \emptyset, \{l_1\}) \xrightarrow{release(l_1)}$$
$$(\langle q_4, b_5\rangle, \bot, T_2, \emptyset, \emptyset) \rightarrow (\langle q_5, b_4b_3\rangle, \bot, T_2, \emptyset, \emptyset) \xrightarrow{release(l_2)}$$
$$(\langle q_6, b_4b_3\rangle, \bot, \bot, \emptyset, \emptyset) \rightarrow (\langle q_6, b_1b_2b_3\rangle, \bot, \bot, \emptyset, \emptyset).$$

Since the states $c_1 = (\langle p_2, a_5\rangle, T_1, \bot, \{l_2\}, \emptyset)$ and $c_2 = (\langle q_2, b_5\rangle, \bot, T_2, \emptyset, \{l_1\})$ are not BAH-compatible as $l_2 \in$ BAH($T_1$, $c_1$, $l_1$, x) = $\{l_2\}$ and $l_1 \in$ BAH($T_2$, $c_2$, $l_2$, y) = $\{l_1\}$, global configuration c is not backward reachable from d in $\mathcal{CP}$. However, it can be seen that $c'_1 = (\langle p_1, a_5\rangle, \bot, \bot, \emptyset, \emptyset)$ is backward reachable from $d_1$ in $T_1$ and $c'_2 = (\langle q_1, b_5\rangle, \bot, \bot, \emptyset, \emptyset)$ from $d_2$ in $T_2$. Note that since all locks of $\mathcal{CP}$ are free in $c'_1$ and $c'_2$, the BAH of each lock is the empty set in these configurations. In this case, however, since $c'_1$ and $c'_2$ are trivially BAH-compatible, $c' = (\langle p_1, a_5\rangle, \langle q_1, b_5\rangle, \bot, \bot)$ is backward reachable from d in $\mathcal{CP}$.

An MA accepting the pre*-closure of a regular set of BAH-enhanced configurations accepted by a given MA can be constructed as follows: Start with an MA $\mathcal{A}$ accepting a regular set C of acquisition history augmented configurations of an APDS $\mathcal{T}$. Corresponding to each augmented control state ($p_j, l_1, \ldots, AH_1, \ldots, AH_k$) we have an initial state ($s_j, l_1, \ldots, l_m, AH_1, \ldots, AH_k$) of the multi-automation $\mathcal{A}$, and vice versa. Set $\mathcal{A}_0 = \mathcal{A}$ and construct a finite sequence of multi-automata $\mathcal{A}_0, \ldots, \mathcal{A}_p$ resulting in the multi-automaton $\mathcal{A}_p$ such that the set if AH-augmented configurations accepted by $\mathcal{A}_p$ is the pre*-closure of the set of BAH-augmented configurations accepted by $\mathcal{A}$. We denote by $\rightarrow_i$ as the transition relation of $\mathcal{A}_i$. For every $i \geq 0$, $\mathcal{A}_{i+1}$ is obtained from $\mathcal{A}_i$ by conserving the sets of states and transitions of $\mathcal{A}_i$ and adding new transitions as follows for every transition $(p_j, \gamma) \hookrightarrow \{\langle p_{k_1}, w_1 \rangle, \ldots, \langle p_{k_2}, w_2 \rangle\}$ and every state $q$ such that $$(s_k, l_1, \ldots, l_m, BAH_1, \ldots, BAH_m) \xrightarrow{w}_i q$$

$q$ add a new transition $$(s_j, l_1, \ldots, l_m, BAH_1, \ldots, BAH_m) \xrightarrow{\gamma}_{i+1} q.$$

for every lock release operation $$p_j \xrightarrow{release(l_i)} p_k$$

and for every state $(s_k, l_1, \ldots, l_m, BAH_1, \ldots, BAH_m)$ of $\mathcal{A}_i$ we add a transition $$(s_j, l'_1, \ldots, l'_m, BAH'_1, \ldots, BAH'_m) \xrightarrow{\epsilon}_{i+1}$$
$$(s_k, l_1, \ldots, l_m, BAH_1, \ldots, BAH_m) \text{ to } \mathcal{A}_{i+1}$$

where $\epsilon$ is the empty symbol; $l_i = \perp$; $l'_i = T$; for $r \neq i$, $l'_r = l_r$ and if $l_r = T$ then $BAH'_r = BAH_r \cup \{l_i\}$ else $BAH'_r = BAH_r$.

for every lock acquire operation $$p_j \xrightarrow{acquire(l_i)} p_k$$

and for every state $(s_k, l_1, \ldots, l_m, BAH_1, \ldots, BAH_m)$ of $\mathcal{A}_i$ we add a transition $$(s_j, l'_1, \ldots, l'_m, BAH'_1, \ldots, BAH'_m) \xrightarrow{\epsilon}_{i+1}$$
$$(s_k, l_1, \ldots, l_m, BAH_1, \ldots, BAH_m) \text{ to } \mathcal{A}_{i+1}$$

where $\epsilon$ is the empty symbol; $l_i = T$; $l'_i = \perp$; $BAH'_i = \emptyset$; and for $r \neq i$, $l'_r = l_r$ and $BAH'_r = BAH_r$.

Forward Acquisition History.

The notion of Forward Acquisition History (FAH) is motivated by our goal of using backward reachability to compute those configurations in the pre*-closure of a set C of global configurations of $\mathcal{CP}$ in which all locks are free. FAHs are defined for paths starting at arbitrary states. Since we are only interested in those configurations of pre*(C) is which all locks are free, we need to consider only those computation paths that start at configurations of $\mathcal{CP}$ in which all locks are free.

The notion of Forward Acquisition History can be defined formally as follows. Let x be a computation of a concurrent program $\mathcal{CP}$ leading from configurations c to d. For thread $T_i$ and lock $l_j$ of $\mathcal{CP}$, if $l_j \notin$ Lock-Set$(T_i, d)$ then FAH$(T_i, c, l_j, x)$ is defined to be the empty set $\emptyset$. If $l_j \in$ Lock-Set$(T_i, d)$, then we define FAH$(T_i, c, l_j, x)$ to be the set of locks that were acquired (and possibly released) by $T_i$ after the last acquisition of $l_j$ by $T_i$ in traversing forward along x from c to d. If $l_j \in$ Lock-Set$(T_i, d)$ but $l_j$ was not acquired along x, then FAH$(T_i, c, l_j, x)$ is the set of locks that were acquired (and possibly released) by $T_i$ along x. The following forward decomposition result can then be proven. Let $\mathcal{CP}$ be a concurrent program comprised of the two threads $T_1$ and $T_2$ with nested locks. Then configuration c of $\mathcal{CP}$ in which all locks are free is backward reachable from d iff configurations $c_1 = c \downarrow T_1$ of $T_1$ and $c_2 = c \downarrow T_2$ of $T_2$ are backward reachable from configurations $d_1 = d \downarrow T_1$ and $d_2 = d \downarrow T_2$, respectively, via computation paths x and y of programs comprised solely of threads $T_1$ and $T_2$, respectively, such that 1. Lock-Set$(T_1, d_1) \cap$ Lock-Set$(T_2, d_2) = \emptyset$, and 2. there do not exist locks $l \in$ Lock-Set$(T_1, d_1)$ and $l' \in$ Lock-Set$(T_2, d_2)$ such that $l \in$ FAH$(T_2, c_2, l', y)$ and $l' \in$ FAH$(T_1, c_1, l, x)$.

Unlike pre*-closure for BAH-augmented configurations, an important issue that arises when computing pre*-closure for FAH-augmented configurations, is that we need to compute FAHs while performing a backward reachability analysis. For that we need to augment the configurations of each thread with two extra fields as we now illustrate. Suppose that we want to compute the lock free configurations of pre*($\{d\}$), where d is the configuration $(\langle p_5, a_4a_3 \rangle, \langle q_5, b_4b_3 \rangle, T_1, T_2)$ of the concurrent program shown in FIG. 4. Let $d_1 = d \downarrow T_1 = (p_5, a_4a_3, T_1, \perp)$ and $d_2 = d \downarrow T_2 = (q_5, b_4b_3, \perp, T_2)$. It suffices to compute the set of all pairs of lock-free configurations $c_1$ and $c_2$ of $T_1$ and $T_2$, respectively, such that the FAHs of $c_1$ and $c_2$ along some paths of $T_1$ and $T_2$ starting at $c_1$ and $c_2$ and ending at $d_1$ and $d_2$, respectively, are compatible. Note that, by definition, the FAH of l along a path x from $c_1$ to $d_1$ is the set of locks that were acquired and released since the last acquisition of l in traversing forward along x. Thus while traversing x backwards, we stop updating the FAH of l after encountering the first acquisition of l along x as all lock operations on l encountered after that are immaterial. To ensure that, we maintain two extra entries in the FAH-augmented configurations. The first entry LHI is the set of locks held initially in $d_1$ when starting the backward reachability. The second entry LR is the set of locks from LHI that have been acquired so far in the backward search. For a lock $l \in$ LHI, once a transition acquiring l is encountered for the first time while performing backward reachability, we add it to LR and stop modifying it's FAH even if it is acquired or released again during the backward search. Thus an FAH-augmented configuration is of the form $(\langle p, w \rangle, l_1, \ldots, l_m; FAH_1, \ldots, FAH_m, LHI, LR)$.

Going back to our example, we see that the FAH-augmented configuration $(\langle p_1, a_5 \rangle, \perp, \perp, \{l_2\}, \emptyset, \{l_1\}, \{l_1\})$ of the augmented thread $T_1$ belongs to pre*$_{T_1}(\{d_1\})$ via the backwardly traversed path x:

$$(\langle p_5, a_4a_3 \rangle, T_1, \perp, \emptyset, \emptyset, \{l_1\}, \emptyset) \leftarrow$$
$$(\langle p_4, a_5 \rangle, T_1, \perp, \emptyset, \emptyset, \{l_1\}, \emptyset) \xleftarrow{release(l_2)}$$
$$(\langle p_3, a_5 \rangle, T_1, T_1, \{l_2\}, \emptyset, \{l_1\}, \emptyset) \xleftarrow{acquire(l_2)}$$
$$(\langle p_2, a_5 \rangle, T_1, \perp, \{l_2\}, \emptyset, \{l_1\}, \emptyset) \xleftarrow{acquire(l_1)}$$
$$(\langle p_1, a_5 \rangle, \perp, \perp, \{l_2\}, \emptyset, \{l_1\}, \{l_1\}).$$

Similarly, the FAH-augmented configuration $(\langle q_1, b_5 \rangle, \bot, \bot, \emptyset, \{l_1\}, \{l_2\}, \{l_2\})$ of the thread $T_2$ belongs to $pre^*_{T_2}(\{d_2\})$ via the backwardly traversed path y:

$(\langle q_5, b_4 b_3 \rangle, \bot, T_2, \emptyset, \emptyset, \{l_2\}, \emptyset) \leftarrow$ $(\langle q_4, b_5 \rangle, \bot, T_2, \emptyset, \emptyset, \{l_2\}, \emptyset) \xleftarrow{release(l_1)}$ $(\langle q_3, b_5 \rangle, T_2, T_2, \emptyset, \{l_1\}, \{l_2\}, \emptyset) \xleftarrow{aquire(l_1)}$ $(\langle q_2, b_5 \rangle, \bot, T_2, \emptyset, \{l_1\}, \{l_2\}, \emptyset) \xleftarrow{aquire(l_2)}$ $(\langle q_1, b_5 \rangle, \bot, \bot, \emptyset, \{l_1\}, \{l_2\}, \{l_2\})$.

Since augmented states $c_1=(\langle p_1, a_5 \rangle, \bot, \bot, \{l_2\}, \emptyset, \{l_1\}, \{l_1\})$ and $c_2=(\langle q_1, b_5 \rangle, \bot, \bot, \{l_1\}, \{l_2\}, \{l_2\})$ are not FAH-compatible as $l_2 \in \{l_2\}=FAH(T_1, c_1, l_1, x)$ and $l_1 \in \{l_1\}=FAH(T_2, c_2, l_2, y)$, global configuration c is not backward reachable from d in $\mathcal{CP}$.

An MA accepting the pre*-closure of a regular set of HAF-enhanced configurations can be constructed as follows: Start with an MA $\mathcal{A}$ accepting a regular set C of FAH-augmented configurations of a thread (PDA) T. Corresponding to each augmented control state $(p_j, l_1, \ldots, l_m, FAH_1, \ldots, FAH_m, LHI, LR)$ we have an initial state $(s_j, l_1, \ldots, l_m, FAH_1, \ldots, FAH_m, LHI, LR)$ of the multi-automaton $\mathcal{A}$, and vice versa. Set $\mathcal{A}_0 = \mathcal{A}$ and construct a finite sequence of multi-automata $\mathcal{A}_0, \ldots, \mathcal{A}_p$ resulting in the multi-automaton $\mathcal{A}_p$ such that the set of FAH-augmented configurations accepted by $\mathcal{A}_p$ is the pre*-closure of the set of FAH-augmented configurations accepted by $\mathcal{A}$. We denote by $\rightarrow_i$ as the transition relation of $\mathcal{A}_i$. For every $i \geq 0$, $\mathcal{A}_{i+1}$ is obtained from $\mathcal{A}_i$ by conserving the sets of states and transitions of $\mathcal{A}_i$ and adding new transitions as follows for every transition $(p_j, \gamma) \hookrightarrow (p_k, w)$ and every state q such that $(s_k, l_1, \ldots, l_m, FAH_1, \ldots, FAH_m, LHI, LR) \xrightarrow{w}_i q$ add a new transition $(s_j, l_1, \ldots, l_m, FAH_1, \ldots, FAH_m, LHI, LR) \xrightarrow{\gamma}_{i+1} q$.

for every lock release operation $p_j \xstackrel{release(l_i)}{\hookrightarrow} p_k$ and for every state $(s_k, l_1, \ldots, l_m, FAH_1, \ldots, FAH_m, LHI, LR)$ of $\mathcal{A}_i$ we add a transition $(s_j, l'_1, \ldots, l'_m, FAH'_1, \ldots, FAH'_m, LHI, LR) \xrightarrow{\epsilon}_{i+1}$
$(s_k, l_1, \ldots, l_m, FAH_1, \ldots, FAH_m, LHI, LR)$ to $\mathcal{A}_{i+1}$ where $\in$ is the empty symbol; $l_i = \bot$, $l'_i = T$; and for $r \neq i$, $l'_r = l_r$. For each lock $l_{i'}$, if $l_{i'} \in LHI \setminus LR$ then $FAH'_{i'} = FAH_{i'} \cup \{l_i\}$, else $FAH'_{i'} = FAH_{i'}$.

for every lock acquire operation $p_j \xstackrel{aquire(l_i)}{\hookrightarrow} p_k$ and for every state $(s_k, l_1, \ldots, l_m, FAH_1, \ldots, FAH_m, LHI, LR)$ of $\mathcal{A}_i$ we add a transition $(s_j, l'_1, \ldots, l'_m, FAH_1, \ldots, FAH_m, LHI, LR') \xrightarrow{\epsilon}$
$i+1 (s_k, l_1, \ldots, l_m, FAH_1, \ldots, FAH_m LHI, LR)$ to $\mathcal{A}_{i+1}$ where $\in$ is the empty symbol; $l_i = T$; $l'_i = \bot$ and for $r \neq i$, $l'_r = l_r$. Also, if $l_i \in LHI \setminus LR$ then $LR' = LR \cup \{l_i\}$.

By tracking patterns of lock acquisition and releases, it can be shown that an LMAP accepting the pre*-closure of the set of configurations accepted by the LMAP $\mathcal{A}=(\mathcal{A}_1, \mathcal{A}_2)$ is the pair $\mathcal{B}=(\mathcal{B}_1, \mathcal{B}_2)$, where $\mathcal{B}_i$ is a multi-automaton accepting the pre*-closure of the set of configurations of thread $T_i$ accepted by $\mathcal{A}_i$. This reduces the pre*-closure computation of a set of configurations of a concurrent program with threads interacting via nested locks to its individual threads and thereby not only avoids the state explosion problem but, as can be shown, makes the procedure provably efficient.

To track lock interactions, it is advantageous to augment the configurations of each thread with their respective backward and forward acquisition histories and the LHI and LR fields as discussed above. Thus an augmented configuration of thread $T_i$ is of the form $(\langle c, w \rangle, l_1, \ldots, l_m, BAH_1, \ldots, BAH_m, FAH_1, \ldots, FAH_m, LHI, LR)$, where $BAH_i$ and $FAH_i$ are used to track the backward and forward acquisition histories, respectively, of lock $l_i$. As in the case of a multi-automaton, we have an initial state of $\mathcal{A}_i$ corresponding to each configuration of $T_i$, and vice versa. Since in this case the configurations are augmented with FAHs and BAHs, each initial state of $\mathcal{A}_i$ is of the form $(\langle s_i, w \rangle, l_1, \ldots, l_m, BAH_1, \ldots, BAH_m, FAH_1, \ldots, FAH_m, LHI, LR)$, where $(\langle p_i, w \rangle, l_1, \ldots, l_m, BAH_1, \ldots, BAH_m, FAH_1, \ldots, FAH_m, LHI, LR)$ is an augmented configuration of $T_i$. We say that augmented configurations $s=(\langle c, w \rangle, l_1, \ldots, l_m, BAH_1, \ldots, BAH_m, FAH_1, \ldots, FAH_m, LHI, LR)$ and $t=(\langle c', w' \rangle, l'_1, \ldots, l'_m, BAH'_1, \ldots, BAH'_m, FAH'_1, \ldots, FAH'_m, LHI', LR')$ of $T_1$ and $T_2$, respectively, are FAH-compatible iff there do not exist locks $l_i$ and $l_j$ such that $l_i = T_1$, $l'_j = T_2$, $l_i \in FAH'_j$ and $l_j \in FAH_i$. Analogously, we say that s and t are BAH-compatible iff there do not exist locks $l_i$ and $l_j$ such that $l_i = T_1$, $l'_j = T_2$, $l_i \in BAH'_j$ and $l_j \in BAH_i$.

Let $\mathcal{A}=(\mathcal{A}_1, \mathcal{A}_2)$ be a $\mathcal{CP}$-LMAP. We say that $\mathcal{A}$ accepts global configuration $(\langle p_i, w \rangle, \langle q_j, v \rangle, l_1, \ldots, l_m)$ of $\mathcal{CP}$ iff there exist sets $FAH_1, \ldots, FAH_m, BAH_1, \ldots, BAH_m, LHI, LR, FAH'_1, \ldots, FAH'_m, BAH'_1, \ldots, BAH'_m, LHI', LR'$ such that if $s_1=(\langle p_i, w \rangle, l'_1, \ldots, l'_m, BAH_1, \ldots, BAH_m, FAH_1, \ldots, FAH_m, LHI, LR)$ and $s_2=(\langle q_j, v \rangle, l''_1, \ldots, l''_m, BAH'_1, \ldots, BAH'_m, FAH'_1, \ldots, FAH'_m, LHI', LR')$, where $l'_i = T_1$ if $l_i = T_1$ and $\bot$ otherwise and $l''_i = T_2$ if $l_i = T_2$ and $\bot$ otherwise, then 1. $\mathcal{A}_i$ accepts $s_i$, and
2. Lock-Set$(T_1, s_1) \cap$ Lock-Set$(T_2, s_2) = \emptyset$ and $LHI \cap LHI' = \emptyset$.
3. $s_1$ and $s_2$ are BAH-compatible and FAH-compatible.

Given a $\mathcal{CP}$-LMAP A, we use C on $f(\mathcal{A})$ to denote the set of configurations of $\mathcal{CP}$ accepted by $\mathcal{A}$. A set of configurations C of $\mathcal{CP}$ is called lock-constrained regular if there exists a $\mathcal{CP}$-LMAP $\mathcal{A}$ such that $C = C$ on $f(\mathcal{A})$. For model checking LTL properties of concurrent programs interacting via nested locks we need two key properties of LMAPs (i) closure under boolean operations, and
(ii) closure under pre*-computation.

With respect to closure of LMAPs under boolean operations, let $\mathcal{A}=(\mathcal{A}_1, \mathcal{A}_2)$ and $\mathcal{B}=(\mathcal{B}_1, \mathcal{B}_2)$, be given $\mathcal{CP}$-LMAPs and op a boolean operation. Then, broadly speaking, the closure of LMAPs under op follows from the facts that (1) $\mathcal{A}$ op $\mathcal{B}=(\mathcal{A}_1$ op $\mathcal{B}_1$, $\mathcal{A}_2$ op $\mathcal{B}_2$), and (2) MAs are closed under boolean operations. With respect to closure under intersection, given $\mathcal{CP}$-LMAPs $\mathcal{A}=(\mathcal{A}_1, \mathcal{A}_2)$ and $\mathcal{B}=(\mathcal{B}_1, \mathcal{B}_2)$, we can construct a $\mathcal{CP}$-LMAP accepting Conf($\mathcal{A}$)∩Conf($\mathcal{B}$).

Accordingly, computation of the pre*-closure of an LMAP can proceed as follows. Let LC be a lock-constrained regular set accepted by a $\mathcal{CP}$-LMAP $\mathcal{A}=(\mathcal{A}_1, \mathcal{A}_2)$. It can be shown that it is possible to efficiently, in polynomial time, construct a $\mathcal{CP}$-LMAP $\mathcal{B}=(\mathcal{B}_1, \mathcal{B}_2)$ accepting (1) pre*(LC) in case all locks are free in each configuration of LC, or (2) those configurations of pre*(LC) in which all locks are free. Since $\mathcal{A}_1$ and $\mathcal{A}_2$ are MAs accepting regular sets of configurations of the individual PDSs $T_1$ and $T_2$, respectively, we can construct, for example, using the efficient techniques given above, multi-automata $\mathcal{A}_1$ and $\mathcal{A}_2$, accepting, respectively, the pre*-closures, pre*$_{T_1}$(Conf($\mathcal{A}_1$)) and pre*$_{T_2}$(Conf($\mathcal{A}_2$)). In the first case, since all locks are free in each configuration of LC, the forward acquisition history of each lock as well as the LHI and LR fields are ∅. Thus these fields do not come into play and so $\mathcal{B}_1$ and $\mathcal{B}_2$ can be computed using the procedure given above, thereby giving the following proposition. Let LC be a lock-constrained regular set of configurations of $\mathcal{CP}$ such that all locks are free in every configuration c∈LC. If $\mathcal{A}$ is a $\mathcal{CP}$-LMAP accepting LC and if $\mathcal{B}$ is the $\mathcal{CP}$-LMAP constructed from $\mathcal{A}$ as above, then Conf($\mathcal{B}$)=pre*(LC). In the second case, we are interested only in those configurations c of pre*(LC) in which all locks are free and due to which each BAH field of c is the empty set. Thus, in this case, the BAH fields are immaterial, and so $\mathcal{B}_1$ and $\mathcal{B}_2$ can be computed using the second procedure set forth above. Thus, if $\mathcal{A}$ is a $\mathcal{CP}$-LMAP accepting a lock-constrained regular set LC and if $\mathcal{B}$ is the $\mathcal{CP}$-LMAP constructed from $\mathcal{B}$ as above, then Conf($\mathcal{B}$)∩LF=pre*(LC)∩LF, where LF is the set of all configurations of $\mathcal{CP}$ in which all locks are free.

Note that the computation of an LMAP accepting the pre*-closure of given LMAP $\mathcal{A}=(\mathcal{A}_1, \mathcal{A}_2)$ reduces to the computation of MAs $\mathcal{B}_i$ accepting the pre*-closure of Conf($\mathcal{A}_i$) for each individual thread $T_i$, instead of the entire program $\mathcal{CP}$. $\mathcal{B}_i$ can be computed in time polynomial in the sizes of $\mathcal{A}_i$ and the control states of $T_i$ and exponential in the number of locks of $T_i$. Thus it can be shown that, given a concurrent program $\mathcal{CP}$ comprised of threads $T_1$ and $T_2$ interacting via nested locks, and a $\mathcal{CP}$-LMAP $\mathcal{A}=(\mathcal{A}_1, \mathcal{A}_2)$, then in the two cases considered above, we can construct a $\mathcal{CP}$-LMAP $\mathcal{A}_{pre*}$ recognizing pre*(Conf($\mathcal{A}$)) in time polynomial in the sizes of $\mathcal{A}_i$ and the control states of $T_i$ and exponential in the number of locks of $\mathcal{CP}$.

Branching Time Temporal Logic

The above technique can be extended so as to apply to branching time temporal logic, such as alternation-free Mu-calculus.

Let Prop be a set of atomic propositions and $\chi$ a finite set of variables. The set of formulas of the propositional μ-calculus is defined by the following grammar:

$$\phi ::= \pi \in Prop | X \in \chi | \vee \phi | \phi \vee \phi | \exists \bigcirc \phi | \mu X \cdot \phi$$

where in formulas of the form μX·$\phi$, the variable X must occur in $\phi$ under an even number of negations. The Alternation-free Mu-Calculus is the fragment of the mu-calculus without any meaningful nestings of μs and νs. Furthermore, for a concurrent program comprised of the n threads $T_1, \ldots, T_n$, correctness properties of the form $\wedge h_i$ are considered herein, where $h_i$ is an alternation-free mu-calculus formula interpreted over the set of control locations of thread $T_i$. Note that the global state graph of $\mathcal{CP}$ results from an interleaved execution of the local transitions of the individual threads forcing a thread $T_i$ to stutter when a global transition results from the execution of the local transition of another thread. In order to ensure that $h_i$ is stuttering oblivious, we specify that $h_i$ be a formula of the weak mu-calculus. It is worth mentioning here that the model checking problem for even simple doubly-indexed temporal formulas of the form $\phi(i, j)$ wherein atomic propositions are interpreted over the control states of two or more threads is undecidable for systems comprised of multiple PDSs even if they do not interact with each other. Furthermore, one can show that for threads communicating via locks the model checking problem is undecidable even for single-index alternation free weak mu-calculus formulas. Fortunately, it can be shown that the model checking problem, for PDSs interacting via nested locks for singly indexed alternation-free Mu-calculus, is efficiently decidable.

Reasoning about the branching time behavior of PDSs via the automata theoretic paradigm involves constructing the product of the given PDS with the alternating automaton corresponding to the given property. Such product automata can be naturally modeled as alternating pushdown systems (APDS) and regular sets of configurations of APDSs as Alternating Multi-Automata (AMA). See APPENDIX.

The automata-theoretic paradigm for model checking is again invoked. Given a mu-calculus formula $\phi = \wedge \phi_i$, and a concurrent program $\mathcal{CP}$, comprised of the threads $T_1, \ldots, T_n$, we first construct the product $\mathcal{T}_i$ of $T_i$ and $A_f$ the alternating automaton for f. Each $\mathcal{T}_i$ is represented as an APDS. Note that model checking for each of the threads $T_i$ for $\phi_i$ can be reduced to the computation of pre*-closures of regular sets of configurations $\mathcal{T}_i$. However, for model checking the concurrent program $\mathcal{CP}$ for $\phi$, we need to compute the pre*-closure of regular sets of global configurations of the system comprised of all the APDSs $\mathcal{T}_1, \ldots, \mathcal{T}_n$. For that we need to take into account lock interaction among the threads. The main complexity here lies in the fact that we have to reason about lock interaction along all paths of tree-like models of APDSs $\mathcal{T}_1, \ldots, \mathcal{T}_n$ having potentially infinitely many states.

The technique proceeds analogously to the above. The complexity of reasoning about lock interaction among all paths of tree-like models is overcome by showing how to decompose the computation of the pre*-closure of a regular set of configurations of a concurrent program $\mathcal{CP}$ with threads communicating via nested locks to that of its constituent threads for which existing efficient techniques can be leveraged. This decomposition avoids the state explosion problem. To achieve this decomposition, we leverage the new concept of Lock-Constrained Alternating Multi-Automata Pairs (LAMAP) which are used to capture a regular set of configurations of a given multi-threaded program with nested locks. An LAMAP $\mathcal{A}$ accepting a regular set of configurations C of a program $\mathcal{CP}$ comprised of threads $T_1$ and $T_2$ is pair of AMAs $\mathcal{A}=(\mathcal{A}_1, \mathcal{A}_2)$, where $\mathcal{A}_i$ is an AMA accepting the set of local configurations of APDS $\mathcal{T}_i$ corresponding to thread $T_i$ occurring in the global configurations of $\mathcal{CP}$ in C. The lock interaction among threads is encoded in the acceptance criterion for an LAMAP which filters out those pairs of local configurations of $\mathcal{T}_1$ and $\mathcal{T}_2$ which are not simultaneously reachable due to lock interaction and are therefore not in C. Indeed, for a pair of two tree-like models $w_1$ and $w_2$ for $\phi_1$ and $\phi_2$ in the individual APDS $\mathcal{T}_1$ and $\mathcal{T}_2$, respectively, to act as a witness for $\phi = \phi_1 \wedge \phi_2$ in the concurrent program CP, they need to be reconcilable with respect to each other in order, viz., for each path x in $w_1$ there must be a path y in $w_2$ such that the local computations of $T_1$ and $T_2$ corresponding to x and y, respectively, can be executed in an interleaved fashion, and vice versa. This can be decided by tracking patterns of lock acquisition along x and y. The tracking of lock acquisition patterns along all paths of a tree-like model in each APDS $\mathcal{T}_i$, can be accomplished using the above-mentioned notions of backward acquisition history (BAH) and forward acquisition history (FAH) by merely augmenting the control state of each thread to track a finite amount of extra information. Decomposition is then achieved by showing that given an LAMAP $\mathcal{A}=(\mathcal{A}_1, \mathcal{A}_2)$, if $\mathcal{B}_i$ is an AMA accepting the pre*-closure of the configurations of the individual thread $T_i$ accepted by $\mathcal{A}_i$, then, the LAMAP $\mathcal{B}=(\mathcal{B}_1, \mathcal{B}_2)$ accepts the pre*-closure of the regular set of concurrent program $\mathcal{CP}$ accepted by $\mathcal{A}$. Thus, broadly speaking, the decomposition results from maintaining the local configurations of the constituent threads separately as AMAs and computing the pre*-closures on these AMAs individually for each thread for which existing efficient techniques can be leveraged.

Lock-Constrained Alternating Multi-Automata Pair.

The concept of Lock-Constrained Alternating Multi-Automata Pair (LAMAP) is herein introduced which is used to represent regular sets of configurations of concurrent programs with threads communicating via nested locks. It can be shown that LAMAPs are closed under the computation of pre*-closures and that the model checking problem of threads interacting via nested locks can be reduced to the computation of pre*-closures of regular sets of configurations accepted by LAMAPs. Thus LAMAPs allow us to finitely represent (potentially infinite) regular sets of configurations of the given concurrent program in a way that enables us to compute their pre*-closures efficiently. A key property of LAMAPs is that not only are they closed under the computation of pre*-closures but that the pre*-closure computation for a given LAMAP can be reduced to pre*-closure computations for regular sets of configurations of the individual threads thus avoiding the state explosion problem.

To accomplish the broad goal of reducing the computation of pre*-closure of a set of configurations of $\mathcal{CP}$ accepted by an LAMAP $\mathcal{A}=(\mathcal{A}_1, \mathcal{A}_2)$ to the computation of pre*-closure for the individual threads, it is necessary to capture lock interaction among the threads. Motivated by the above-described forward and backward decomposition results, it is advantageous to augment the configuration of each individual thread with BAH and FAH entries for each lock. Then the pre*-closure pre*$_{\mathcal{T}_i}$(C) for a regular set C of configurations of $\mathcal{T}_i$ accepted by a given AMA $\mathcal{A}_i$ is computed over these augmented configurations. To test whether tree-like witnesses wit$_1$ and wit$_2$ of $\mathcal{T}_1$ and $\mathcal{T}_2$, respectively, are reconcilable, we need to check that for each local path of $T_1$ along wit$_1$ there is a local path y of $T_2$ along wit$_2$ such that x and y can be fired in an interleaved fashion, and vice versa. Using the decomposition result, it suffices to check whether there exists a path y of wit$_2$ that is acquisition history compatible with x, i.e., x and y satisfy the conditions of the decomposition result. Thus while performing the pre*-closure computation for APDS $\mathcal{T}_i$, we need to track acquisition histories along each path of wit$_2$. Note however that since the number of locks in concurrent program CP is fixed, viz., k, so is the number of all possible acquisition histories, viz., O($2^k$). An important consequence is that instead of storing the acquisition history for each path of wit$_2$, we need only store the different acquisition histories encountered in all paths of wit$_2$. This ensures that the set of acquisition histories that need be tracked is bounded and can therefore be incorporated into the control state of APDS $\mathcal{T}_2$. More generally, an acquisition history enhanced configuration of $\mathcal{T}_i$ is now of the form $\langle$(p, $\mathcal{AH}$), u$\rangle$, where AH={AH$_1$, ..., AH$_n$} is a set of acquisition history tuples that tracks the set of acquisition histories along all paths of a run of $\mathcal{T}_i$. Each tuple AH$_i$ is of the form (LH, BAH$_1$, ..., BAH$_m$, FAH$_1$, ..., FAH$_m$, LHI, LP), where LH denotes the locks held currently; BAH$_j$ and FAH$_j$ entries track, respectively, the backward and forward acquisition histories of lock $l_j$. The entries LHI and LP are required for computing FAH while performing a backward reachability analysis. Note that, by definition, the FAH of lock l along a path x from $c_1$ to $d_1$ is the set of locks that were acquired and released since the last acquisition of l in traversing forward along x. Indeed, while traversing x backwards, we stop updating the FAH of lock l after encountering the first acquisition of l along x as all lock operations on l encountered after that are immaterial. The LHI entry is the set of locks held initially in $d_1$ when starting the backward reachability. The LR entry is the set of locks from LHI that have been acquired so far in the backward search. For a lock l∈LHI, once a transition acquiring l is encountered for the first time while performing backward reachability, we add it to LR and stop modifying it's FAH even if it is acquired or released again during the backward search.

To construct an AMA accepting the pre*-closure of a regular set of AH-enhanced configurations of an APDS $\mathcal{T}$ accepted by a given AMA (used later in the pre*-closure computation of LAMAPs), the following procedure can be utilized for constructing an AMA accepting the pre*-closure of a regular set of (non-enhanced) configurations accepted by a given AMA. Start with an AMA $\mathcal{A}$ accepting a regular set C of acquisition history augmented configurations of an APDS $\mathcal{T}$. Corresponding to each augmented control state ($p_j$, $\mathcal{AH}$) we have an initial state ($s_j$, $\mathcal{AH}$) of the multi-automaton $\mathcal{A}$, and vice versa. We set $\mathcal{A}_0 = \mathcal{A}$ and construct a finite sequence of AMAs $\mathcal{A}_0, \ldots, \mathcal{A}_p$ resulting in the AMA $\mathcal{A}_p$ such that the set of AH-augmented configurations accepted by $\mathcal{A}_p$ is the pre*-closure of the set of AH-augmented configurations accepted by $\mathcal{A}$. We denote by $\rightarrow_i$ the transition relation of $\mathcal{A}_i$. For every i≧0, $\mathcal{A}_{i+1}$ is obtained from $\mathcal{A}_i$ by conserving the sets of states and transitions of $\mathcal{A}_i$ and adding new transitions as follows for every transition $\langle(p_j, \gamma)\hookrightarrow\{\langle p_{k_1}, w_1\rangle, \ldots, \langle p_{k_n}, w_n\rangle\}$ and every set $$(s_{k_1}, \mathcal{AH}_1) \xrightarrow{w_1}_i Q_1, \ldots, (s_{k_n}, \mathcal{AH}_n) \xrightarrow{w_n}_i Q_n,$$

we add the new transition $$(s_j, \mathcal{AH}_1 \cup \ldots \cup \mathcal{AH}_n) \xrightarrow{\gamma}_{i+1} (Q_1 \cup \ldots \cup Q_n).$$

for every lock release operation $$p_j \xrightarrow{release(l_{j'})} p_k$$

and for every state ($s_k$, {AH$_1$, ..., AH$_m$}) of $\mathcal{A}_i$ we add a transition $$(s_j, \{AH'_1, \ldots, AH'_m\}) \xrightarrow{\epsilon}_{i+1} (s_k, \{AH_1, \ldots, AH_m\}) \text{ to } \mathcal{A}_{i+1}$$

where ∈ is the empty symbol and for 1≦q≦n, AH$_q$=(LH$_q$, BAH$_{q1}$, ..., BAH$_{qm}$, FAH$_{q1}$, ..., FAH$_{qm}$, LHI$_q$, LR$_q$) and AH'$_q$=(LH'$_q$, BAH'$_{q1}$, ..., BAH'$_{qm}$, FAH'$_{q1}$, ..., FAH'$_{qm}$, LHI'$_q$, LR'$_q$), where $l_t \notin$ LH$_q$ and LH'$_q$=LH$_q \cup \{l_t\}$ and if $l_t$=

$\mathcal{T}$ then BAH'$_{qr}$=BAH$_{qr}$∪{1$_{i'}$} else BAH'$_{qr}$=BAH$_{qr}$=∅ and for each lock 1$_{i''}$, if 1$_{i''}$∈LHI$_q$\LR$_q$ then FAH'$_{qi''=FAHqi''}$∪{1$_{i'}$}, else FAH'q$_{i''}$=FAH$_{qi''}$.

for every lock acquire operation $$p_j \xrightarrow{acquire(l_{i'})} p_k$$

and for every state ($s_k$, {AH$_1$, . . . , AH$_m$}) of A$_i$ we add a transition $$(s_j, \{AH'_1, \ldots, AH'_m\}) \xrightarrow{\epsilon}_{i+1} (s_k, \{AH_1, \ldots, AH_m\}) \text{ to } \mathcal{A}_{i+1}$$

where ∈ is the empty symbol; for 1≤q≤n, AH$_q$=(LH$_q$, BAH$_{q1}$, . . . , BAH$_{qm}$, FAH$_{q1}$, . . . , FAH$_{qm}$, LHI$_q$, LR$_q$) and AH'$_q$=(LH'$_q$, BAH'$_{q1}$, . . . , BAH'$_{qm}$, FAH'$_{q1}$, . . . , FAH'$_{qm}$, LHI'$_q$, LR'$_q$), where 1$_i$∈LH$_q$ and LH'$_q$=LH$_q$\{1$_i$} AH'$_{qi'}$=∅; and for r≠i', AH'$_{qr}$=AH$_{qr}$. Also, if 1$_i$∈LHI$_q$\LR$_q$ then LR'$_q$=LR$_q$∪{1$_{i'}$}

Thus, given an APDS $\mathcal{T}$, and a regular set of AH-augmented configurations accepted by a $\mathcal{T}$-AMA $\mathcal{A}$, it is possible to construct a $\mathcal{T}$-AMA $\mathcal{T}_{pre^*}$ recognizing pre* (Conf($\mathcal{T}$)) in time polynomial in the size of the control set of $\mathcal{T}$ and exponential in $\mathcal{A}$ and the number of locks of $\mathcal{T}$.

Given a concurrent program $\mathcal{CP}$ comprised of the two threads T$_1$=(P$_1$,Act$_1$,Γ$_1$,c$_1$,Δ$_1$) and T$_2$=(P$_2$,Act$_2$,Γ$_2$,c$_2$,Δ$_2$), an LAMAP for $\mathcal{CP}$, denoted by $\mathcal{CP}$-LAMAP, is a pair ($\mathcal{A}_1$, $\mathcal{A}_2$), where $\mathcal{A}_i$=(Γ$_i$, Q$_i$, δ$_i$, I$_i$, F$_i$) is an AMA accepting a (regular) set of configurations of the APDS $\mathcal{T}_i$ corresponding to thread T$_i$. To track lock interactions, we augment the configurations of each thread with their respective backward and forward acquisition histories and the LHI and LR fields as discussed above. Let c$_1$=⟨(c$_1$, $\mathcal{AH}_1$), w$_1$⟩, and c$_2$=⟨(c$_2$, $\mathcal{AH}_2$), w$_2$⟩ be AH-augmented configurations of $\mathcal{T}_1$ and $\mathcal{T}_2$, respectively. Recall that by our construction, $\mathcal{AH}_1$ tracks the set of acquisition histories encountered along all paths of a tree-like run w$_1$ of $\mathcal{T}_1$ with each acquisition history tuple AH$_{1,j}$∈$\mathcal{AH}_1$ tracking the acquisition history of some path of T$_1$ along w$_1$. We say that acquisition history tuples AH$_1$=(LH, BAH$_1$, . . . , BAH$_m$, FAH$_1$, . . . , FAH$_m$, LHI, LR) and AH$_2$=(LH', BAH'$_1$, . . . , BAH'$_m$, FAH'$_1$, . . . , FAH'$_m$, LHI', LR') are compatible if the following conditions are satisfied (i) Disjointness of Lock-sets: LH∩LH'=∅ and LHI∩LHI'=∅, (ii) FAH-compatibility: there do not exist locks 1$_i$ and 1$_j$ such that 1$_i$=T$_1$, 1'$_j$=T$_2$, 1$_i$∈FAH'$_j$ and 1$_j$∈FAH$_i$, and (iii) BAH-compatibility: there do not exist locks 1$_i$ and 1$_j$ such that 1$_i$=T$_1$, 1'$_j$=T$_2$, 1$_i$∈BAH'$_j$ and 1$_j$∈BAH$_i$. Then for a local path of T$_1$ along w$_1$ starting at c$_1$ to be executable in an interleaved fashion with a local path of T$_2$ starting at c$_2$ there must exist AH$_{1,j}$∈$\mathcal{AH}_1$ and AH$_{2,j'}$∈$\mathcal{AH}_2$ such that AH$_{1,j}$ and AH$_{2,j'}$ are compatible.

Let $\mathcal{A}$=($\mathcal{A}_1$, $\mathcal{A}_2$) be a $\mathcal{CP}$-LAMAP. We say that $\mathcal{A}$ accepts a pair ⟨(p$_1$, $\mathcal{AH}_1$), u$_1$⟩, ⟨(p$_2$, $\mathcal{AH}_2$), u$_2$⟩ of augmented configurations of $\mathcal{T}_1$ and $\mathcal{T}_2$ iff 1. $\mathcal{A}_i$ accepts ⟨(p$_i$, $\mathcal{AH}_i$), u$_i$⟩, and
2. $\mathcal{AH}_1$ and $\mathcal{AH}_2$ are AH-compatible, viz., for each tuple AH$_1$∈$\mathcal{AH}_1$ there exists a tuple AH$_2$∈$\mathcal{AH}_2$ such that AH$_1$ and AH$_2$ are compatible, and vice versa.

Given a $\mathcal{CP}$-LAMAP $\mathcal{A}$, we use Conf($\mathcal{A}$) to denote the set of pairs of configurations of $\mathcal{T}_1$ and $\mathcal{T}_2$ accepted by $\mathcal{A}$. A set of configurations C of $\mathcal{CP}$ is called lock-constrained regular if there exists a $\mathcal{CP}$-LAMAP $\mathcal{A}$ such that C=Conf($\mathcal{A}$).

The pre*-closure of a LAMAP can be computed as follows. Let LC be a lock-constrained regular set accepted by a $\mathcal{CP}$-LAMAP $\mathcal{A}$=($\mathcal{A}_1$, $\mathcal{A}_2$). It can be shown that it is possible to efficiently, in polynomial time, construct a $\mathcal{CP}$-LAMAP $\mathcal{B}$=($\mathcal{B}_1$, $\mathcal{B}_2$) accepting pre*(LC). Since $\mathcal{A}_1$ and $\mathcal{A}_2$ are AMAs accepting regular sets of configurations of the individual APDSs $\mathcal{T}_1$ and $\mathcal{T}_2$, respectively, we can construct AMAs $\mathcal{B}_1$ and $\mathcal{B}_2$, accepting, respectively, the pre*-closures, pre*$\mathcal{T}_1$(Conf($\mathcal{A}_1$)) and pre*$\mathcal{T}_2$(Conf($\mathcal{A}_2$)). Let LC be a lock-constrained regular set of configurations of $\mathcal{CP}$. If $\mathcal{A}$ is a $\mathcal{CP}$-LAMAP accepting LC and if $\mathcal{B}$ is the $\mathcal{CP}$-LAMAP constructed from $\mathcal{A}$ as above, then Conf($\mathcal{B}$)=pre*(LC).

The model checking of concurrent programs with nested locks for single-index alternation-free mu-calculus formulas can then be reduced to model checking the individual threads as follows. Let $\mathcal{CP}$ be a concurrent program comprised of the PDSs T$_1$=(P$_1$, Act$_1$, Γ$_1$, c$_1$, Δ$_1$) and T$_2$=(P$_2$, Act$_2$, Γ$_2$, c$_2$, Δ$_2$) and a labeling function Λ$_i$: P$_i$→$2^{Prop_i}$. Let h=∧h$_i$, where h$_i$ is an alternation-free weak μ-calculus formula interpreted over the control states of thread T$_i$ and let $\mathcal{V}_i$ be a valuation of the free variables in h$_i$. We begin by constructing an APDS $\mathcal{T}_i$ that represents the product of T$_i$ and an alternating automaton for h$_i$. Set φ=h$_i$. We start by considering the case where all the σ-subformulas of φ are μ-formulas. The product APDS $\mathcal{T}_i$=(P$_i^\Phi$, Γ$_i$, Δ$_i^\Phi$) of T$_i$ and the alternating automaton for h$_i$, is straightforward to define and is given in the APPENDIX. To decide whether two runs of $\mathcal{T}_1$ and $\mathcal{T}_2$ are reconcilable, we need to augment each configuration of $\mathcal{T}_i$ with acquisition history information as discussed above. With this in mind, let $\mathcal{C}_t^i$ be the subset of configurations of $\mathcal{T}_i$ containing all augmented configurations of the form ([(p, $\mathcal{AH}_p$), π], w), where π∈Λ(p) and $\mathcal{AH}_p$∈AH$_p$,
([(p, $\mathcal{AH}_p$), ¬π], w), where π∉Λ(p) and $\mathcal{AH}_p$∈AH$_p$,
([(p, $\mathcal{AH}_p$), X], w), where X is free in φ and (p, w)∈$\mathcal{V}$(X) and $\mathcal{AH}_p$∈AH$_p$.

where for control location p, AH$_p$={{(LH, BAH$_1$, . . . , BAH$_m$, FAH$_1$, . . . , FAH$_m$, LHI, LR)}| for each i, BAH$_1$=∅=FAH$_i$, LH=∅ and both LH and LHI equal some (the same) lockset held at p starting at the initial configuration of T$_i$}. Note that there could be potentially many different locksets held at control state p of T$_i$ which can be enumerated by model checking T$_i$ individually for reachability. Clearly, if $\mathcal{V}_i$ is a regular set of configurations for every variable X free in φ$_i$, then $\mathcal{C}_t^i$ is also a regular set of configurations. Using the concept of signatures for mu-calculus sentences, the following proposition can be shown: Let $\mathcal{T}_i$ be the APDS obtained from T$_i$ and φ using the construction above. A configuration ⟨(p, $\mathcal{AH}$) w⟩ of $\mathcal{T}_i$ belongs to [[φ$_i$]] iff the configuration ⟨[(p, $\mathcal{AH}$), φ$_i$], w⟩ of $\mathcal{T}_i$ belongs to pre*$\mathcal{T}_i(\mathcal{C}_t^i)$ Then, the case where all the σ-subformulas of φ$_i$ are ν-subformulas can now be tackled by (i) noting that the negation of φ$_i$ is equivalent to a formula φ'$_i$ in positive normal form whose σ-subformulas are all μ-subformulas (ii) applying the above proposition, to construct an AMA which accepts the configurations of P that satisfy φ'$_1$, and finally (iii) using the fact that AMAs are closed under complementation.

Then the general case for the alternation-free mu calculus can be handled by recursively applying the procedure for the above two cases giving us the following result for threads with AH-augmented control states: Let $\mathcal{T}_i$ be the APDS corresponding to thread T$_i$ as constructed above, and let φ$_i$ a formula of the alternation-free mu-calculus, and let $\mathcal{V}_i$ be a valuation of the free variables of φ$_i$. We can construct an AMA $\mathcal{A}_{\phi_i}$ such that Conf($\mathcal{A}_{\phi_i}$)=[[φ$_i$]]$\mathcal{T}_i(\mathcal{V}_i)$. The key decomposition result can be formulated as follows. For each i, let $\mathcal{T}_i$ be the APDS obtained from T$_i$ and φ$_i$ using the construction above. A configuration c=⟨(p$_1$, w$_1$), (p$_2$, w$_2$), 1$_1$, . . . , 1$_m$⟩ of $\mathcal{AH}$ belongs to [[h]] iff for each i, the configuration ([(p$_i$, $\mathcal{AH}_i$), h$_i$], w$_i$) of $\mathcal{T}_i$ belongs to Conf($\mathcal{A}_i$), for some pair of AH-compatible pair of acquisition history sets $\mathcal{AH}_1$ and $\mathcal{AH}_2$. This reduces the model checking problem to the construction of the AMAs $\mathcal{AH}_i$. Thus, the model checking problem for single index alternation-free weak Mu-calculus formulas for systems comprised of two PDSs communicating via nested locks is decidable in time exponential in the sizes of control states of the individual PDSs and the number of locks.

Nested Locks Check.

It can be advantageous to test whether each thread accesses locks in a nested fashion. The following is an efficient technique for checking whether locks are nested.

Let $T=(P, Act, \Gamma, c_0, \Delta)$ be a thread of a concurrent program CP using locks $l_1, \ldots, l_m$. One way of testing whether T accesses locks in a nested fashion is to maintain information regarding the order in which locks are accessed by T. Towards that end, one can augment each control state $c \in P$ to store the order of lock accesses. Thus each state of the augmented thread $T_a$ can be of the form $(c, l_{i_1}, \ldots, l_{i_k})$ where $l_{i_1}, \ldots, l_{i_k}$ is a sequence indicating the order in which locks were acquired by T with $i_k$ being the most recent lock to be acquired. It is readily seen that for $j \neq l$, $l_{i_j} \neq l_{i_l}$. Thus, for each transition acquiring lock l and augmented state $(c, \lambda)$ of $T_a$ one can concatenate l to $\lambda$. For any transition releasing lock l and augmented state $(c, \lambda)$, one can check to see whether l is the lock at the end of the sequence $\lambda$. If it is, then l is removed from $\lambda$, else one can let $T_a$ transit to a newly introduced control state Error. Thus, locks are nested in T iff the control state Error is not reachable in $T_a$. This reduces the problem of deciding whether thread T access locks in a nested fashion to model checking $T_a$, the augmented version of T, for reachability of the Error control state, which can be done efficiently. Note that these checks for lock nesting can be done individually on the augmented version of each thread and do not need to be done on the concurrent program $\mathcal{CP}$.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

APPENDIX

System Model.

Each thread is modeled as a pushdown system which has a finite control part corresponding to the valuation of the variables of the thread it represents and a stack which models recursion.

Formally, a PDS can be represented by a five-tuple $\mathcal{P}=(P, Act, \Gamma, c_0, \Delta)$, where P is a finite set of control locations, Act is a finite set of actions, $\Gamma$ is a finite stack alphabet, and $\Delta \subseteq (P \times \Gamma) \times Act \times (P \times \Gamma^*)$ is a finite set of transition rules. If $((p, \gamma), a, (p', w)) \in \Delta$ then we write $$\langle p, \gamma \rangle \xhookrightarrow{a} \langle p', w \rangle.$$

A configuration of $\mathcal{P}$ is a pair $\langle p, w \rangle$, where $p \in P$ denotes the control location and $w \in \Gamma^*$ the stack content. We call $c_0$ the initial configuration of $\mathcal{P}$. The set of all configurations of $\mathcal{P}$ is denoted by $\mathcal{C}$. For each action a, we define a relation $$\xrightarrow{a} \subseteq C \times C$$

as follows:

$$\text{if } \langle q, \gamma \rangle \xhookrightarrow{a} \langle q', w \rangle,$$

then $$\langle q, \gamma v \rangle \xrightarrow{a} \langle q', wv \rangle$$

for every $v \in \Gamma^*$. A global configuration of $\mathcal{CP}$ is a tuple $c=(t_1, \ldots, t_n, l_1, \ldots, l_m)$ where $t_1, \ldots, t_n$ are, respectively, the configurations of threads $T_1, \ldots, T_n$ and $l_1, \ldots, l_m$ the values of the locks. If no thread holds lock $l_i$ in configuration c, then $l_i = \bot$, else $l_i$ is an index identifying the thread currently holding the lock. The initial global configuration of $\mathcal{CP}$ is $(c_1, \ldots, c_n, \bot, \ldots, \bot)$, where $c_i$ is the initial configuration of thread $T_i$. Thus all locks are free to start with. We extend the relation $$\xrightarrow{a}$$

to global configurations of $\mathcal{CP}$ as follows: Let $c=(c_1, \ldots, c_n, l_1, \ldots, l_m)$ and $c'_1=(c'_1, \ldots, c'_n, l'_1, \ldots, l'_m)$ be global configurations. Then $$c \xrightarrow{a} c'$$

if there exists $1 \leq i \leq n$ such that $$c_i \xrightarrow{a} c'_i,$$

and for all $1 \leq j \leq n$ such that $i \neq j$, $$c_j = c'_j,$$

and for all $1 \leq k \leq m$, $l_k = l'_k$.

$$c \xrightarrow{acq(l_i)} c'$$

if there exists $1 \leq j \leq n$ such that $$c_j \xrightarrow{acq(l_i)} c'_j,$$

and $l_i=\perp$, and $l'_j=j$, and for all $1 \leq k \leq n$ such that $k \neq j$, $c_k=c'_k$, and for all $1 \leq p \leq m$ such that $p \neq i$, $l_p=l'_p$.

$$c \xrightarrow{rel(l_i)} c'$$

if there exists $1 \leq j \leq n$ such that $$c_j \xrightarrow{rel(l_i)} c'_j,$$

and $l_i=j$, and $l'_i=\perp$, and for all $1 \leq k \leq n$ such that $k \neq j$, $c_k=c'_k$, and for all $1 \leq p \leq m$ such that $p \neq i$, $l_p=l'_p$.

The reachability relation $\Rightarrow$ is the reflexive and transitive closure of the successor relation $\rightarrow$ defined above. A sequence $x=x_0, x_1, \ldots$ of global configurations of $\mathcal{CP}$ is a computation if $x_0$ is the initial global configuration of $\mathcal{CP}$ and for each i, $$x_i \xrightarrow{a} x_{i+1},$$

where either for some j, $a \in Act_j$ or for some k, $a=\text{release}(l_k)$ or $a=\text{acquire}(l_k)$. Given a thread $T_i$ and a reachable global configuration $c=(c_1, \ldots, c_n, l_1, \ldots, l_m)$ of $\mathcal{CP}$, we use Lock-Set $(T_i, c)$ to denote the set of locks held by $T_i$ in c, viz., the set $\{l_j | l_j = T_i\}$. Also, given a thread $T_i$ and a reachable global configuration $c=(c_1, \ldots, c_n, l_1, \ldots, l_m)$ of $\mathcal{CP}$, the projection of c onto $T_i$, denoted by $c \downarrow T_i$, is defined to be the configuration $(c_i, l'_1, \ldots, l'_m)$ of the concurrent program comprised solely of the thread $T_i$, where $l'_i=T_i$ if $l_i=T_i$ and $\perp$, otherwise (locks not held by $T_i$ are freed).

Multi-Automaton.

Multi-Automata are used to capture regular (potentially infinite) sets of configurations of a PDS in a finite form. Let $\mathcal{P}=(P, Act, \Gamma, c_0, \Delta)$ be a pushdown system, where $P=\{p_1, \ldots, p_m\}$. A $\mathcal{P}$-multi-automaton ($\mathcal{P}$-MA for short) is a tuple $\mathcal{A}=(\Gamma, Q, \delta, I, F)$ where Q is a finite set of states, $\delta \subseteq Q \times \Gamma \times Q$ is a set of transitions, $I=\{s_1, \ldots, s_m\} \subseteq Q$ is a set of initial states and $F \subseteq Q$ is a set of final states. Each initial state $s_i$ corresponds to a control state $p_i$ of $\mathcal{P}$, and vice versa. We define the transition relation $\rightarrow Q \times \Gamma^* \times Q$ as the smallest relation satisfying the following: (i) if $(q, \gamma, q') \in \delta$ then $$q \xrightarrow{\gamma} q', \quad (ii) q \xrightarrow{\epsilon} q$$

for every $q \in Q$, and (iii) if $$q \xrightarrow{w} q'' \text{ and } q'' \xrightarrow{\gamma} q' \text{ then } q \xrightarrow{w\gamma} q'.$$

We say that $\mathcal{A}$ accepts a configuration $\langle p_i, w \rangle$ iff $$s_i \xrightarrow{w} q$$

for some $q \in F$. The set of configurations recognized by $\mathcal{A}$ is denoted by $\text{Conf}(\mathcal{A})$.

Backward Decomposition Result

Let $\mathcal{CP}$ be a concurrent program comprised of the two threads $T_1$ and $T_2$ with nested locks. Then configuration c of $\mathcal{CP}$ is backward reachable from configuration d in which all locks are free iff configurations $c_1=c \downarrow T_1$ of $T_1$ and $c_2=c \downarrow T_2$ of $T_2$ are backward reachable from configurations $d_1=d \downarrow T_1$ and $d_2=d \downarrow T_2$, respectively, via computation paths x and y of programs comprised solely of threads $T_1$ and $T_2$, respectively, such that 1. Lock-Set$(T_1, c_1) \cap$ Lock-Set$(T_2, c_2)=\emptyset$
2. there do not exist locks $l \in$ Lock-Set$(T_1, c_1)$ and $l' \in$ Lock-Set$(T_2, c_2)$ such that $l \in$ BAH$(T_2, c_2, l', y)$ and $l' \in$ BAH$(T_1, c_1, l, x)$.

Forward Decomposition Result.

Let $\mathcal{CP}$ be a concurrent program comprised of the two threads $T_1$ and $T_2$ with nested locks. Then configuration c of $\mathcal{CP}$ in which all locks are free is backward reachable from d iff configurations $c_1=c \downarrow T_1$ of $T_1$ and $c_2=c \downarrow T_2$ of $T_2$ are backward reachable from configurations $d_1=d \downarrow T_1$ and $d_2=d \downarrow T_2$, respectively, via computation paths x and y of programs comprised solely of threads $T_1$ and $T_2$, respectively, such that 1. Lock-Set$(T_1, d_1) \cap$ Lock-Set$(T_2, d_2)=\emptyset$, and
2. there do not exist locks $l \in$ Lock-Set$(T_1, d_1)$ and $l' \in$ Lock-Set$(T_2, d_2)$ such that $l \in$ FAH$(T_2, c_2, l', y)$ and $l' \in$ FAH$(T_1, c_1, l, x)$.

Dual Pumping.

$\mathcal{BP}$ has an accepting run starting from an initial configuration c if and only if there exist $\alpha \in \Gamma_1, \beta \in \Gamma_2$; $u \in \Gamma^*_1, v \in \Gamma^*_2$; an accepting configuration g; configurations $lf_0, lf_1, lf_2$ and $lf_3$ in which all locks are free; lock values $l_1, \ldots, l_m, l'_1, \ldots, l'_m$; control states p', p''' $\in P_1$, q', q'' $\in P_2$; u', u'', u''' $\in \Gamma^*_1$; and v', v'', v''' $\in \Gamma^*_2$ satisfying the following conditions 1. $c \Rightarrow (\langle p, \alpha u \rangle, \langle q', v' \rangle, l_1, \ldots, l_m)$ 2. $(\langle p, \alpha \rangle, \langle q', v' \rangle, l_1, \ldots, l_m) \Rightarrow lf_0 \Rightarrow (\langle p', u' \rangle, \langle q, \beta v \rangle, l'_1, \ldots, l'_m)$ 3. $(\langle p', u' \rangle, \langle q, \beta \rangle, l'_1, \ldots, l'_m)$ $\Rightarrow lf_1$ $\Rightarrow g$ $\Rightarrow lf_2$ $\Rightarrow (\langle p, \alpha u'' \rangle, \langle q'', v'' \rangle, l_1, \ldots, l_m)$ $\Rightarrow lf_3$ $\Rightarrow (\langle p''', u''' \rangle, \langle q, \beta v''' \rangle, l'_1, \ldots, l'_m)$ Alternation-Free Weak Mu-Calculus.

Let Prop be a set of atomic propositions and $\chi$ a finite set of variables. The set of formulas of the propositional $\mu$-calculus is defined by the following grammar:

$$\phi ::= \pi \in \text{Prop} | X \in \chi | \vee \phi | \phi \vee \phi | \exists \bigcirc \phi | \mu X \cdot \phi$$

where in formulas of the form $\mu X.\phi$, the variable X must occur in $\phi$ under an even number of negations. We interpret formulas on the set of configurations of a PDS $\mathcal{P}=(P', \Gamma, \Delta)$. A labeling function $\Gamma:P \rightarrow 2^{Prop}$, which intuitively assigns to each variable a set of configurations. The set of configurations of $\mathcal{P}$ that satisfy a formula $\phi$ is denoted by $[[\phi]]_P(\mathcal{V})$ and defined by the following rules:

$[[\pi]]^{\mathcal{P}}(\mathcal{V})=\Lambda^{-1}(\pi) \times \Gamma^*$ $[[X]]^{\mathcal{P}}(\mathcal{V})=\mathcal{V}(X)$ $[[\neg \phi]]^{\mathcal{P}}(\mathcal{V})=(P \times \Gamma^*) \setminus [[\phi]]^{\mathcal{P}}(\mathcal{V})$ $[[\phi_1 \vee \phi_2]]^{\mathcal{P}}(\mathcal{V})=[[\phi_1]](\mathcal{V})^{\mathcal{P}}(\mathcal{V}) \cup [[\phi_2]]^{\mathcal{P}}(\mathcal{V})$ $[[\exists \bigcirc \phi]]^{\mathcal{P}}(\mathcal{V})=\text{pre}([[\phi_1]]^{\mathcal{P}}(\mathcal{V}))$ $[[\nu X \cdot \phi]]_P(V)=\cup \{\mathcal{C} \subseteq P \times \Gamma^* | \mathcal{C} \subseteq [[\phi]]^{\mathcal{P}}(\mathcal{V}[\mathcal{C}/X])\}$ where $\mathcal{V}[[\mathcal{P}/X]]$ is the valuation which coincides with $\mathcal{V}$ for all variables but X, where it takes the value $\mathcal{P}$.

The set of formulas in positive normal form is defined by the following syntax:

$$\phi ::= \pi \mid \neg \pi \mid X \mid \phi \wedge \phi \mid \phi \vee \phi \mid \exists \bigcirc \phi \mid \forall \bigcirc \phi \mid \nu X \cdot \phi \mid \nu X \cdot \phi$$

A σ-subformula of a formula σX.φ(X) is proper if it does not contain any occurrence of X. The Alternation-free Mu-Calculus is the set of formulas φ in positive normal form such that for every σ-subformula φ of φ the following holds (i) if φ is a μ-formula, then all its ν-subformula are proper, and (ii) if φ is a ν-formula, then all its μ-subformula are proper.

The weak mu-calculus is obtained from the mu-calculus by replacing the modalities $\exists \bigcirc \phi$ and $\forall \bigcirc \phi$ by $\exists \bigcirc_w \phi$ and $\forall \bigcirc_w \phi$, respectively, where $[[\exists \bigcirc \phi]])\mathcal{P}(\mathcal{V}) = \{c \mid \exists c$ such that $c \Rightarrow_i c'$ we have $c' \in [[\phi]]\mathcal{P}(\mathcal{V})\}$ and $[[\exists \bigcirc \phi]]\mathcal{P}(\mathcal{V}) = \{c \mid \forall c$ such that $c \Rightarrow_i c'$ we have $c' \in [[\phi]]\mathcal{P}(\mathcal{V})\}$ Alternating Pushdown Systems.

An APDS is a five-tuple $\mathcal{P} = (P, \Gamma, c_0, \Delta)$, where P is a finite set of control locations, Γ is a finite stack alphabet, $c_0$ the initial configuration, and Δ is a finite set of transition rules that assigns to each element of P×Γ a negation free boolean formula over elements of P×Γ*. Assuming that the boolean formulae are always in disjunctive normal form, we can equivalently define Δ as a subset of the set (P×Γ)×Act×$2^{P \times \Gamma^*}$ of transition rules. If $(p, \gamma) \hookrightarrow \{(p_1, w_1), \ldots, (p_n, w_n)\}$, then for each w∈Γ*, the configuration $\langle p, \gamma w \rangle$ is an immediate predecessor of the set $\langle \langle p_1, w_1 w \rangle, \ldots, \langle p_n, w_n w \rangle \}$ which is the immediate successor of $\langle p, \gamma w \rangle$. Intuitively, at the configuration $\langle p, \gamma w \rangle$ the APDS nondeterministically selects a transition rule of the form $(p, \gamma) \hookrightarrow \{(p_1, w_1), \ldots, (p_n, w_n)\}$ and forks n copies in the configuration $\langle p_1, w_1 w \rangle, \ldots, \langle p_n, w_n w \rangle$.

A run of $\mathcal{P}$ for an initial configuration c is a tree of configurations with root c, such that the children of a configuration c' are the configurations that belong to one of its immediate successors (nodes of the form $\langle p, \in \rangle$ have no successors).

We define the reachability relation $\Rightarrow \subset (P \times \Gamma^*) \times 2^{P \times \Gamma^*}$ between configurations and sets of configurations. Informally, c⇒C if and only if C is a finite frontier of a run of $\mathcal{P}$ starting from c. Formally, ⇒ is the smallest subset of $(P \times \Gamma^*) \times 2^{(P \times \Gamma^*)}$ such that
  c⇒{c} for every c∈P×Γ*,
  if c is an immediate successor of C, then c⇒C,
  if c⇒{$c_1, \ldots, c_m$} and $c_i \Rightarrow C_i$ for each 1≤i≤n, then
    c⇒($C_1 \cup \ldots \cup C_n$).

The function pre$\mathcal{P}$: $2^{P \times \Gamma^*} \to 2^{P \times \Gamma^*}$ is now defined as follows: c belongs to pre$_\mathcal{P}$(C) if some immediate successor of c is contained in C. We denote by pre$\overset{*}{\mathcal{P}}$ the transitive closure of pre$\mathcal{P}$, viz., pre$\overset{*}{\mathcal{P}}$(C)={c∈P×Γ*}. A set $\mathcal{C}$ of configurations is regular if for each control location p∈$\mathcal{P}$ the language {w∈Γ*∣⟨p, w⟩∈C} is regular.

For each action a, we define a relation $$\overset{a}{\to} \subseteq C \times C$$

as follows: if $$\langle q, \gamma \rangle \overset{a}{\dashrightarrow} \langle q', w \rangle,$$

then $$\langle q, \gamma v \rangle \overset{a}{\to} \langle q', wv \rangle$$

for every v∈Γ*. We say that ⟨q, γv⟩ is an immediate predecessor of ⟨q', wv⟩ and ⟨q', wv⟩ an immediate successor of ⟨q, γv⟩. The reachability relation ⇒ is the reflexive and transitive closure of the immediate successor relation. The predecessor function pre*: $2^C \to 2^C$ of $\mathcal{P}$ is defined as follows: c belongs to pre*(C) if some successor of c belongs to C. We define post* (C) similarly.

Alternating Multi-Automaton.

Alternating Multi-Automata are used to capture regular (potentially infinite) sets of configurations of an APDS in a finite form. Let $\mathcal{P} = (P, \Gamma, c_0, \Delta)$ be an alternating pushdown system, where P={$p_1, \ldots, p_m$}. A $\mathcal{P}$ alternating-multi-automaton ($\mathcal{P}$-AMA for short) is a tuple $\mathcal{A} = (\Gamma, Q, \delta, I, F)$ where Q is a finite set of states, I={$s_1, \ldots, s_m$} ⊂ Q is a set of initial states and F⊂Q is a set of final states, and δ is a function that assigns to every pair of Q×Γ a positive boolean formula with Q as a set of variables. Equivalently, we can represent δ as a set of transitions which are elements of (Q×Γ)×$2^Q$. The transition relation →⊂Q×Γ*×$2^Q$ is the smallest relation satisfying
  if (q, γ, Q')∈δ then $$q \overset{\gamma}{\to} Q',$$

for every $$q \in Q, q \overset{\epsilon}{\to} \{q\}$$

if $q \overset{w}{\to} \{q_1, \ldots, q_n\}$ and $q_i \overset{\gamma}{\to} Q_i$ for each 1≤i≤nm then $$q \overset{w\gamma}{\to} (Q_1 \cup \ldots \cup Q_n).$$

Each initial state $s_i$ corresponds to a control state $p_i$ of $\mathcal{P}$, and vice versa. A configuration ⟨$p_i$, q⟩ is recognized by $\mathcal{A}$ if $$s_i \overset{w}{\to} Q'$$

for some Q'⊂F. Given a finite sequence w∈Γ* and a state s∈Q, a run of $\mathcal{A}$ over w starting from q is a finite tree whose nodes are labeled by states in Q and whose edges are labeled by symbols in Γ, such that the root is labeled by q, and the labeling of the other nodes is consistent with δ. Notice that in such a tree each sequence of edges going from the root to the leaves is labeled by w, and hence, all the edges starting at the same level of the tree have the same label, and all the leaves of the tree at the same height.

We define the transition relation→⊂Q×Γ*×Q as the smallest relation satisfying the following: (i) if (q, γ, q')∈δ then $$q \overset{\gamma}{\to} q', (ii) q \overset{\epsilon}{\to} q \qquad (ii)$$

for every q∈Q, and (iii) if $$q \overset{w}{\to} q'' \text{ and } q'' \overset{\gamma}{\to} q' \text{ then } q \overset{w\gamma}{\to} q'.$$

We say that $\mathcal{A}$ accepts a configuration ⟨$p_i$, w⟩ iff $$s_i \overset{w}{\to} q$$

for some q∈F. The set of configurations recognized by $\mathcal{A}$ is denoted by Conf($\mathcal{A}$).

Defining The Product APDS.

We define the product $\mathcal{T}_i = (P_i^\Phi, \Gamma_i, \Delta_i^\Phi)$, where $P_i^\Phi = (P_i \times 2^{AH}) \times cl(\phi)$, where $cl(\phi)$ is the Fischer-Ladner Closure of $\phi$ and AH is the set of all possible acquisition history tuples, viz., $(2^L)^{2|L|+3}$, where L is the set of locks used by $T_i$. Here $P_i \times 2^{AH}$ represents the AH-augmented state of $\mathcal{T}_i$.

$\Delta_i^\Phi$ is the smallest set of transition rules satisfying the following conditions for every state $[p, \phi]$ and every stack symbol $\gamma \in \Gamma$ if $\phi = \phi_1 \vee \phi_2$, then $([p, \phi], \gamma) \Rightarrow ([p, \phi_1], \gamma)$ and $([p, \phi], \gamma) \hookrightarrow [p, \phi_2], \gamma)$ if $\phi = \phi_1 \wedge \phi_2$, then $([p, \phi], \gamma) \hookrightarrow \{([p, \phi_1], \gamma), ([p, \phi_2], \gamma)\}$ if $\phi = \mu Y \cdot \psi(Y)$ then $([p, \phi], \gamma) \hookrightarrow ([p, \psi(\phi)], \gamma)$ if $\phi \exists \bigcirc_w \psi$ and $(p, \gamma) \hookrightarrow (q, w) \in \Delta_i$ then $([p, \phi], \gamma) \hookrightarrow ([p, \psi], w)$ if $\phi = \forall \bigcirc \psi$ then $([p, \phi], \gamma) \hookrightarrow \{(q, \psi, w) | (p, \gamma) \hookrightarrow (q, w)\}$.

Enumerating All Possible Locksets at Control Location of PDS.

If we want to check whether a set L of locks can be held at p, then we can introduce an extra control state $c_L$ in $T_i$ and cause $T_i$ to transit to $c_L$ only if the thread $T_i$ currently holds exactly the locks in L. Then the problem reduces to checking whether control state $T_i$ is reachable in $T_i$ which can be accomplished in polynomial time in the size of the control state of $T_i$. Note that we need to model check only $T_i$ and not the entire concurrent program, since any local computation of $T_i$ in a computation of $\mathcal{CP}$ can be mimicked by executing only $T_i$ and letting other processes stutter in their initial states without executing any transition and not offering any competition for locks to $T_i$, i.e., by $T_i$ alone.

What is claimed is:

1. A method for model checking of a concurrent multi-threaded software program for a correctness property, said method comprising computer implemented steps of:
   modeling the multi-threaded software program as a concurrent system of pushdown systems communicating using nested locks, each thread modeled as a pushdown system;
   analyzing each individual thread of the program such that each lock is associated, between the lock's acquisition and release, with a separate set of backward and forward lock acquisition histories, where a backward lock acquisition history for a given lock is the set of only the locks that have been released before the given lock is released, and a forward lock acquisition history for the given lock is the set of only the locks that have been acquired after the given lock is acquired; and
   merging analysis results by checking compatibility of lock acquisition histories from a plurality of said individual threads to determine whether the program satisfies the correctness property, expressed as a temporal logic formula.

2. The method of claim 1 wherein model checking of the concurrent system is conducted by determining whether there is an acceptance path in an automaton constructed from the concurrent system and from the correctness property.

3. The method of claim 1 wherein lock-constrained multi-automata are used to compute sets of states reachable from a given set of states in said concurrent multi-threaded software program.

4. The method of claim 1 wherein the correctness property is expressed as a formula using linear time temporal logic.

5. The method of claim 1 wherein the correctness property is expressed as a formula using branching time temporal logic.

6. A method for model checking of a concurrent multi-threaded software program for a correctness property, said method comprising computer implemented steps of:
   modeling the multi-threaded software program as a concurrent system of pushdown systems communicating using nested locks, each thread modeled as a pushdown system;
   constructing an automaton for the correctness property;
   constructing a product automaton for the automaton and for the concurrent system of pushdown systems; and
   determining whether there is an acceptance path in the product automaton for the correctness property by:
   analyzing each individual thread of the program such that each lock is associated, between the lock's acquisition and release, with a separate set of backward and forward lock acquisition histories, where a backward lock acquisition history for a given lock is the set of only the locks that have been released before the given lock is released, and a forward lock acquisition history for the given lock is the set of only the locks that have been acquired after the given lock is acquired; and
   merging analysis results by checking compatibility of lock acquisition histories from the plurality of individual threads to determine whether the program satisfies the correctness property, expressed as a temporal logic formula.

7. The method of claim 6 wherein the correctness property is expressed as a formula using linear time temporal logic.

8. The method of claim 6 wherein the correctness property is expressed as a formula using branching time temporal logic.

9. The method of claim 6 wherein automata are used to capture regular sets of configurations of the concurrent system of pushdown systems.

10. A method for model checking of a concurrent multi-threaded software program for a correctness property, said method comprising computer implemented steps of:
    constructing an automaton from a model of the multi-threaded soft-ware program and the correctness property;
    decomposing a search for an acceptance path in the automaton into multiple instances of reachability problems across individual threads in the model of the multi-threaded software program;
    wherein each thread is modeled as a pushdown system;
    analyzing each individual thread of the program such that each lock is associated, between the lock's acquisition and release, with a separate set of backward and forward lock acquisition histories, where a backward lock acquisition history for a given lock is the set of only the locks that have been released before the given lock is released, and a forward lock acquisition history for the given lock is the set of only the locks that have been acquired after the given lock is acquired; and
    merging analysis results by checking compatibility of lock acquisition histories from a plurality of said individual threads to determine whether the program satisfies the correctness property, expressed as a temporal logic formula.

11. The method of claim 10 wherein the correctness property is expressed as a formula using linear time temporal logic.

12. The method of claim 10 wherein the correctness property is expressed as a formula using branching time temporal logic.

13. The method of claim 1 wherein lock-constrained alternating multi-automata are used to compute sets of states reachable from a given set of states in said concurrent multi-threaded software program.

14. The method of claim 6 wherein lock-constrained multi-automata are used to compute sets of states reachable from a given set of states in said concurrent multi-threaded software program.

15. The method of claim 6 wherein lock-constrained alternating multi-automata are used to compute sets of states reachable from a given set of states in said concurrent multi-threaded software program.

16. The method of claim 10 wherein lock-constrained multi-automata are used to compute sets of states reachable from a given set of states in said concurrent multi-threaded software program.

17. The method of claim 10 wherein lock-constrained alternating multi-automata are used to compute sets of states reachable from a given set of states in said concurrent multi-threaded software program.

\* \* \* \* \*